(12) United States Patent
Quanci et al.

(10) Patent No.: US 11,365,355 B2
(45) Date of Patent: Jun. 21, 2022

(54) SYSTEMS AND METHODS FOR TREATING A SURFACE OF A COKE PLANT

(71) Applicant: SUNCOKE TECHNOLOGY AND DEVELOPMENT LLC, Lisle, IL (US)

(72) Inventors: John Francis Quanci, Haddonfield, NJ (US); Gary Dean West, Lisle, IL (US); Mayela Carolina Fernandez, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 16/729,036

(22) Filed: Dec. 27, 2019

(65) Prior Publication Data
US 2020/0208060 A1    Jul. 2, 2020

Related U.S. Application Data

(60) Provisional application No. 62/786,157, filed on Dec. 28, 2018, provisional application No. 62/785,728, (Continued)

(51) Int. Cl.
*C10B 29/06* (2006.01)
*C23D 5/08* (2006.01)
(Continued)

(52) U.S. Cl.
CPC .............. *C10B 29/06* (2013.01); *B23P 6/04* (2013.01); *C10B 5/02* (2013.01); *C10B 25/16* (2013.01);
(Continued)

(58) Field of Classification Search
CPC ......... C10B 15/02; C10B 29/06; C10B 25/16; C10B 29/02; C10B 29/00; F27D 1/16;
(Continued)

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

Espace Net translation of Suzuki et al. (JP 2010-229239).*
(Continued)

*Primary Examiner* — Jonathan Luke Pilcher
(74) *Attorney, Agent, or Firm* — Perkins Coie LLP

(57) ABSTRACT

The present technology relates to systems and methods for reducing leaks in a system for coking coal. For example, some embodiments provide systems and method for treating a cracked or leaking surface in a system for coking coal. In particular, the present technology includes systems having one or more substances configured to reduce an airflow through one or more cracks by creating an at least partially impermeable patch. The present technology further includes methods for treating surfaces having one or more cracks to reduce an airflow through the one or more cracks.

18 Claims, 15 Drawing Sheets

Related U.S. Application Data filed on Dec. 28, 2018, provisional application No. 62/786,096, filed on Dec. 28, 2018, provisional application No. 62/786,194, filed on Dec. 28, 2018.

(51) Int. Cl.

| | | |
|---|---|---|
| *C10B 5/02* | (2006.01) | |
| *C10B 25/16* | (2006.01) | |
| *C10B 45/00* | (2006.01) | |
| *B23P 6/04* | (2006.01) | |
| *C10B 41/00* | (2006.01) | |
| *G01M 3/20* | (2006.01) | |
| *C10B 15/02* | (2006.01) | |
| *C10B 29/02* | (2006.01) | |
| *C10B 31/00* | (2006.01) | |

(52) U.S. Cl.
CPC .............. *C10B 41/00* (2013.01); *C10B 45/00* (2013.01); *C23D 5/08* (2013.01); *G01M 3/20* (2013.01); *G01M 3/202* (2013.01); *G01M 3/207* (2013.01); *C10B 15/02* (2013.01); *C10B 29/02* (2013.01); *C10B 31/00* (2013.01)

(58) Field of Classification Search
CPC ........... F27D 1/1621; F27D 2001/1605; F27D 2001/161
See application file for complete search history.

(56) References Cited

U.S. PATENT DOCUMENTS

| | | | |
|---|---|---|---|
| 760,372 A | 5/1904 | Beam | |
| 845,719 A | 2/1907 | Schniewind | |
| 875,989 A | 1/1908 | Garner | |
| 976,580 A | 7/1909 | Krause | |
| 1,140,798 A | 5/1915 | Carpenter | |
| 1,424,777 A | 8/1922 | Schondeling | |
| 1,430,027 A | 9/1922 | Plantinga | |
| 1,486,401 A | 3/1924 | Van Ackeren | |
| 1,530,995 A | 3/1925 | Geiger | |
| 1,572,391 A | 2/1926 | Klaiber | |
| 1,677,973 A | 7/1928 | Marquard | |
| 1,705,039 A | 3/1929 | Thornhill | |
| 1,721,813 A | 7/1929 | Geipert | |
| 1,757,682 A | 5/1930 | Palm | |
| 1,818,370 A | 8/1931 | Wine | |
| 1,818,994 A | 8/1931 | Kreisinger | |
| 1,830,951 A | 11/1931 | Lovett | |
| 1,848,818 A | 3/1932 | Becker | |
| 1,895,202 A | 1/1933 | Montgomery | |
| 1,947,499 A | 2/1934 | Schrader et al. | |
| 1,955,962 A | 4/1934 | Jones | |
| 1,979,507 A | 11/1934 | Underwood | |
| 2,075,337 A | 3/1937 | Burnaugh | |
| 2,141,035 A | 12/1938 | Daniels | |
| 2,195,466 A | 4/1940 | Otto | |
| 2,235,970 A | 3/1941 | Wilputte | |
| 2,340,283 A | 1/1944 | Vladu | |
| 2,340,981 A | 2/1944 | Otto | |
| 2,394,173 A | 2/1946 | Harris et al. | |
| 2,424,012 A | 7/1947 | Bangham et al. | |
| 2,486,199 A | 10/1949 | Nier | |
| 2,609,948 A | 9/1952 | Laveley | |
| 2,641,575 A | 6/1953 | Otto | |
| 2,649,978 A | 8/1953 | Such | |
| 2,667,185 A | 1/1954 | Beavers | |
| 2,723,725 A | 11/1955 | Keiffer | |
| 2,756,842 A | 7/1956 | Chamberlin et al. | |
| 2,813,708 A | 11/1957 | Frey | |
| 2,827,424 A | 3/1958 | Homan | |
| 2,873,816 A | 2/1959 | Emil et al. | |
| 2,902,991 A | 9/1959 | Whitman | |
| 2,907,698 A | 10/1959 | Schulz | |
| 2,968,083 A * | 1/1961 | Lentz | C04B 41/5059 264/30 |
| 3,015,893 A | 1/1962 | McCreary | |
| 3,026,715 A | 3/1962 | Briggs | |
| 3,033,764 A | 5/1962 | Hannes | |
| 3,175,961 A | 3/1965 | Samson | |
| 3,199,135 A | 8/1965 | Trucker | |
| 3,224,805 A | 12/1965 | Clyatt | |
| 3,259,551 A | 7/1966 | Thompson | |
| 3,265,044 A | 8/1966 | Juchtern | |
| 3,267,913 A | 8/1966 | Jakob | |
| 3,327,521 A | 6/1967 | Briggs | |
| 3,342,990 A | 9/1967 | Barrington et al. | |
| 3,444,046 A | 5/1969 | Harlow | |
| 3,444,047 A | 5/1969 | Wilde | |
| 3,448,012 A | 6/1969 | Allred | |
| 3,462,345 A | 8/1969 | Kernan | |
| 3,511,030 A | 5/1970 | Brown et al. | |
| 3,542,650 A | 11/1970 | Kulakov | |
| 3,545,470 A | 12/1970 | Paton | |
| 3,587,198 A | 6/1971 | Hensel | |
| 3,591,827 A | 7/1971 | Hall | |
| 3,592,742 A | 7/1971 | Thompson | |
| 3,616,408 A | 10/1971 | Hickam | |
| 3,623,511 A | 11/1971 | Levin | |
| 3,630,852 A | 12/1971 | Nashan et al. | |
| 3,652,403 A | 3/1972 | Knappstein et al. | |
| 3,676,305 A | 7/1972 | Cremer | |
| 3,709,794 A | 1/1973 | Kinzler et al. | |
| 3,710,551 A | 1/1973 | Sved | |
| 3,746,626 A | 7/1973 | Morrison, Jr. | |
| 3,748,235 A | 7/1973 | Pries | |
| 3,784,034 A | 1/1974 | Thompson | |
| 3,806,032 A | 4/1974 | Pries | |
| 3,811,572 A | 5/1974 | Tatterson | |
| 3,836,161 A | 10/1974 | Pries | |
| 3,839,156 A | 10/1974 | Jakobi et al. | |
| 3,844,900 A | 10/1974 | Schulte | |
| 3,857,758 A | 12/1974 | Mole | |
| 3,875,016 A | 4/1975 | Schmidt-Balve | |
| 3,876,143 A | 4/1975 | Rossow et al. | |
| 3,876,506 A | 4/1975 | Dix et al. | |
| 3,878,053 A | 4/1975 | Hyde | |
| 3,894,302 A | 7/1975 | Lasater | |
| 3,897,312 A | 7/1975 | Armour et al. | |
| 3,906,992 A | 9/1975 | Leach | |
| 3,912,091 A | 10/1975 | Thompson | |
| 3,912,597 A | 10/1975 | MacDonald | |
| 3,917,458 A | 11/1975 | Polak | |
| 3,928,144 A | 12/1975 | Jakimowicz | |
| 3,930,961 A | 1/1976 | Sustarsic et al. | |
| 3,933,443 A | 1/1976 | Lohrmann | |
| 3,957,591 A | 5/1976 | Riecker | |
| 3,959,084 A | 5/1976 | Price | |
| 3,963,582 A | 6/1976 | Helm et al. | |
| 3,969,191 A | 7/1976 | Bollenbach | |
| 3,975,148 A | 8/1976 | Fukuda et al. | |
| 3,979,870 A | 9/1976 | Moore | |
| 3,984,289 A | 10/1976 | Sustarsic et al. | |
| 3,990,948 A | 11/1976 | Lindgren | |
| 4,004,702 A | 1/1977 | Szendroi | |
| 4,004,983 A | 1/1977 | Pries | |
| 4,025,395 A | 5/1977 | Ekholm et al. | |
| 4,040,910 A | 8/1977 | Knappstein et al. | |
| 4,045,056 A | 8/1977 | Kandakov et al. | |
| 4,045,299 A | 8/1977 | McDonald | |
| 4,059,885 A | 11/1977 | Oldengott | |
| 4,065,059 A * | 12/1977 | Jablin | C10B 29/06 239/750 |
| 4,067,462 A | 1/1978 | Thompson | |
| 4,077,848 A * | 3/1978 | Gainer | C10B 29/06 201/41 |
| 4,083,753 A | 4/1978 | Rogers et al. | |
| 4,086,231 A | 4/1978 | Ikio | |
| 4,093,245 A | 6/1978 | Connor | |
| 4,100,033 A | 7/1978 | Holter | |
| 4,100,491 A | 7/1978 | Newman, Jr. et al. | |
| 4,100,889 A | 7/1978 | Chayes | |
| 4,111,757 A | 9/1978 | Ciarimboli | |

(56) References Cited

U.S. PATENT DOCUMENTS

| | | |
|---|---|---|
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A * | 3/1979 | van Konijnenburg .. C04B 35/66 264/30 |
| 4,145,195 A | 3/1979 | Knappstein et al. |
| 4,147,230 A | 4/1979 | Ormond et al. |
| 4,162,546 A | 7/1979 | Shortell et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A * | 10/1980 | Rueckl ................ C04B 35/6316 501/119 |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A * | 9/1981 | Thompson ............. C10B 15/02 202/134 |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A * | 6/1984 | Kolvek ................ F27D 1/1621 202/270 |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A * | 6/1988 | van Laar ................ C10B 25/06 202/139 |
| 4,793,981 A | 12/1988 | Doyle et al. |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A * | 1/1998 | Reinke ................... C10B 29/06 202/248 |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |

(56) References Cited

U.S. PATENT DOCUMENTS

| | | |
|---|---|---|
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 * | 6/2009 | Inamasu ............... C10B 29/06 202/239 |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 * | 11/2015 | West ............... C10B 21/10 |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1 | 3/2020 | Dinakaran et al. |
| 10,732,621 B2 | 8/2020 | Cella et al. |
| 10,877,007 B2 | 12/2020 | Steele et al. |
| 1,378,782 A1 | 5/2021 | Floyd |
| 11,008,517 B2 | 5/2021 | Chun et al. |
| 11,008,518 B2 * | 5/2021 | Quanci ............... C10B 5/02 |
| 11,193,069 B2 * | 12/2021 | Quanci ............... C10B 5/02 |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 * | 5/2007 | Inamasu ............... C10B 29/06 202/248 |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |

(56) References Cited

U.S. PATENT DOCUMENTS

| | | | |
|---|---|---|---|
| 2014/0033917 A1 | 2/2014 | Rodgers et al. | |
| 2014/0039833 A1 | 2/2014 | Sharpe, Jr. et al. | |
| 2014/0061018 A1 | 3/2014 | Sarpen et al. | |
| 2014/0083836 A1 | 3/2014 | Quanci et al. | |
| 2014/0156584 A1 | 6/2014 | Motukuri et al. | |
| 2014/0182195 A1 | 7/2014 | Quanci et al. | |
| 2014/0182683 A1 | 7/2014 | Quanci et al. | |
| 2014/0183023 A1 | 7/2014 | Quanci et al. | |
| 2014/0208997 A1 | 7/2014 | Alferyev et al. | |
| 2014/0224123 A1 | 8/2014 | Walters | |
| 2014/0262139 A1 | 9/2014 | Choi et al. | |
| 2014/0262726 A1* | 9/2014 | West | C10B 29/04 201/14 |
| 2015/0122629 A1 | 5/2015 | Freimuth et al. | |
| 2015/0143908 A1 | 5/2015 | Cetinkaya | |
| 2015/0175433 A1 | 6/2015 | Micka et al. | |
| 2015/0219530 A1 | 8/2015 | Li et al. | |
| 2015/0226499 A1 | 8/2015 | Mikkelsen | |
| 2015/0247092 A1 | 9/2015 | Quanci et al. | |
| 2015/0361346 A1 | 12/2015 | West et al. | |
| 2015/0361347 A1 | 12/2015 | Ball et al. | |
| 2016/0026193 A1 | 1/2016 | Rhodes et al. | |
| 2016/0048139 A1 | 2/2016 | Samples et al. | |
| 2016/0149944 A1 | 5/2016 | Obermeirer et al. | |
| 2016/0154171 A1 | 6/2016 | Kato et al. | |
| 2016/0186063 A1 | 6/2016 | Quanci et al. | |
| 2016/0186064 A1 | 6/2016 | Quanci et al. | |
| 2016/0186065 A1 | 6/2016 | Quanci et al. | |
| 2016/0222297 A1 | 8/2016 | Choi et al. | |
| 2016/0319197 A1 | 11/2016 | Quanci et al. | |
| 2016/0319198 A1 | 11/2016 | Quanci et al. | |
| 2017/0015908 A1 | 1/2017 | Quanci et al. | |
| 2017/0182447 A1 | 6/2017 | Sappok et al. | |
| 2017/0183569 A1 | 6/2017 | Quanci et al. | |
| 2017/0253803 A1 | 9/2017 | West et al. | |
| 2017/0261417 A1 | 9/2017 | Zhang | |
| 2017/0313943 A1 | 11/2017 | Valdevies | |
| 2017/0352243 A1 | 12/2017 | Quanci et al. | |
| 2018/0340122 A1 | 11/2018 | Crum et al. | |
| 2019/0099708 A1 | 4/2019 | Quanci | |
| 2019/0161682 A1 | 5/2019 | Quanci et al. | |
| 2019/0169503 A1 | 6/2019 | Chun et al. | |
| 2019/0317167 A1 | 10/2019 | LaBorde et al. | |
| 2019/0352568 A1 | 11/2019 | Quanci et al. | |
| 2020/0071190 A1 | 3/2020 | Wiederin et al. | |
| 2020/0139273 A1 | 5/2020 | Badiei | |
| 2020/0173679 A1 | 6/2020 | O'Reilly et al. | |
| 2020/0208061 A1* | 7/2020 | Quanci | C10B 29/06 |
| 2020/0208062 A1* | 7/2020 | Quanci | C10B 25/16 |
| 2020/0208063 A1* | 7/2020 | Quanci | C23D 5/08 |
| 2021/0130697 A1 | 5/2021 | Quanci et al. | |
| 2021/0163821 A1 | 6/2021 | Quanci et al. | |
| 2021/0163822 A1 | 6/2021 | Quanci et al. | |
| 2021/0163823 A1 | 6/2021 | Quanci et al. | |
| 2021/0198579 A1 | 7/2021 | Quanci et al. | |
| 2021/0340454 A1 | 11/2021 | Quanci et al. | |
| 2021/0363426 A1 | 11/2021 | West et al. | |
| 2021/0363427 A1 | 11/2021 | Quanci et al. | |
| 2021/0371752 A1 | 12/2021 | Quanci et al. | |
| 2021/0388270 A1 | 12/2021 | Choi et al. | |
| 2022/0056342 A1 | 2/2022 | Quanci et al. | |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 2720688 A1 | 11/1978 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 12/1975 |
| JP | S5319301 A | 2/1978 |
| JP | 54054101 | 4/1979 |
| JP | S5453103 A | 4/1979 |
| JP | 57051786 | 3/1982 |

(56) References Cited

FOREIGN PATENT DOCUMENTS

| | | |
|---|---|---|
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010229239 A * | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 17/076,563, filed Oct. 21, 2020, titled System and Method for Repairing a Coke Oven.
U.S. Appl. No. 16/729,129, filed Dec. 27, 2019, titled Coke Plant Tunnel Repair and Flexible Joints.
U.S. Appl. No. 16/729,212, filed Dec. 27, 2019, titled Heat Recovery Oven Foundation.
U.S. Appl. No. 16/828,448, filed Mar. 24, 2020, Quanci et al.
U.S. Appl. No. 16/845,530, filed Apr. 10, 2020, Quanci et al..
U.S. Appl. No. 16/897,957, filed Jun. 10, 2020, Ball et al.
U.S. Appl. No. 17/076,563, filed Oct. 21, 2020, Crum et al.
International Search Report and Written Opinion for PCT/US2019/068817; dated Apr. 29, 2020; 10 pages.
U.S. Appl. No. 14/655,204, filed Jun. 24, 2015, titled Systems and Methods for Removing Mercury From Emissions.
U.S. Appl. No. 16/000,516, filed Jun. 5, 2018, titled Systems and Methods for Removing Mercury From Emissions.
U.S. Appl. No. 13/730,796, filed Dec. 28, 2012, titled Methods and Systems for Improved Coke Quenching.
U.S. Appl. No. 14/655,013, filed Jun. 23, 2015, titled Vent Stack Lids and Associated Systems and Methods.
U.S. Appl. No. 15/014,547, filed Feb. 3, 2016, titled Methods and Systems for Improved Quench Tower Design.
U.S. Appl. No. 15/511,036, filed Mar. 14, 2017, titled Coke Ovens Having Monolith Component Construction.

(56) References Cited

OTHER PUBLICATIONS

U.S. Appl. No. 15/139,568, filed Apr. 27, 2016, titled Automatic Draft Control System for Coke Plants.
U.S. Appl. No. 16/047,198, filed Jul. 27, 2018, titled Coke Plant Including Exhaust Gas Sharing.
U.S. Appl. No. 15/281,891, filed Sep. 30, 2016, titled Exhaust Flow Modifier, Duck Intersection Incorporating the Same, and Methods Therefor.
U.S. Appl. No. 14/587,670, filed Dec. 31, 2014, titled Methods for Decarbonizing Coking Ovens, and Associated Systems and Devices.
U.S. Appl. No. 14/984,489, filed Dec. 30, 2015, titled Multi-Modal Beds of Coking Material.
U.S. Appl. No. 14/983,837, filed Dec. 30, 2015, titled Multi-Modal Beds of Coking Material.
U.S. Appl. No. 14/986,281, filed Dec. 31, 2015, titled Multi-Modal Beds of Coking Material.
U.S. Appl. No. 14/987,625, filed Jan. 4, 2016, titled Integrated Coke Plant Automation and Optimization Using Advanced Control and Optimization Techniques.
U.S. Appl. No. 16/251,352, filed Jan. 18, 2019, titled Method and System for Optimizing Coke Plant Operation and Output.
U.S. Appl. No. 16/428,014, filed May 31, 2019, titled Improved Burn Profiles for Coke Operations.
U.S. Appl. No. 16/735,103, filed Jan. 6, 2020, titled Method and System for Dynamically Charging a Coke Oven.
U.S. Appl. No. 15/987,860, filed May 23, 2018, titled System and Method for Repairing a Coke Oven.
U.S. Patent Application No. 16/729,129, filed Dec. 27, 2019, titled Coke Plant Tunnel Repair and Flexible Joints.
U.S. Appl. No. 16/729,170, filed Dec. 27, 2019, titled Coke Plant Tunnel Repair and Anchor Distribution.
U.S. Appl. No. 16/729,057, filed Dec. 27, 2019, titled Decarbonization of Coke Ovens and Associated Systems and Methods.
U.S. Appl. No. 16/729,219, filed Dec. 27, 2019, titled Heat Recovery Oven Foundation.
U.S. Appl. No. 16/729,219, filed Dec. 27, 2019, titled Spring-Loaded Heat Recovery Oven System and Method.
U.S. Appl. No. 16/428,014, filed May 31, 2019, Quanci et al.
U.S. Appl. No. 16/704,689, filed Dec. 5, 2019, West et al.
U.S. Appl. No. 16/729,053, filed Dec. 27, 2019, Quanci et at.
U.S. Appl. No. 16/729,057, filed Dec. 27, 2019, Quanci et at.
U.S. Appl. No. 16/729,068, filed Dec. 27, 2019, Quanci et at.
U.S. Appl. No. 16/729,122, filed Dec. 27, 2019, Quanci et at.
U.S. Appl. No. 16/729,129, filed Dec. 27, 2019, Quanci et at.
U.S. Appl. No. 16/729,157, filed Dec. 27, 2019, Quanci et at.
U.S. Appl. No. 16/729,170, filed Dec. 27, 2019, Quanci et at.
U.S. Appl. No. 16/729,201, filed Dec. 27, 2019, Quanci et at.
U.S. Appl. No. 16/729,212, filed Dec. 27, 2019, Quanci et at.
U.S. Appl. No. 16/729,219, filed Dec. 27, 2019, Quanci et at.
U.S. Appl. No. 16/735,103, filed Jan. 6, 2020, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Meeh Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1-24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Resources and Utilization of Coking Coal in China," Mingxin Shen ed., Chemical Industry Press, first edition, Jan. 2007, pp. 242-243, 247.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.

(56) References Cited

OTHER PUBLICATIONS

Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https://forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
U.S. Appl. No. 17/155,818, filed Jan. 22, 2021, Choi et al.
U.S. Appl. No. 17/190,720, filed Mar. 3, 2021, West et al.
U.S. Appl. No. 17/191,119, filed Mar. 3, 2021, Quanci et al.
U.S. Appl. No. 17/222,886, filed Apr. 5, 2021, Quanci et al.
U.S. Appl. No. 17/228,469, filed Apr. 12, 2021, Quanci et al.
U.S. Appl. No. 17/228,501, filed Apr. 12, 2021, Quanci et al.
U.S. Appl. No. 17/306,895, filed May 3, 2021, Quanci et al.
U.S. Appl. No. 17/320,343, filed May 24, 2021, Quanci et al.
U.S. Appl. No. 17/321,857, filed May 17, 2021, Quanci et al.
U.S. Appl. No. 17/363,701, filed Jun. 30, 2021, Quanci et al.
U.S. Appl. No. 17/388,874, filed Jul. 29, 2021, Quanci et al.
U.S. Appl. No. 17/459,380, filed Aug. 27, 2021, Quanci et al.
U.S. Appl. No. 17/471,491, filed Sep. 10, 2021, West et al.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.
U.S. Appl. No. 12/403,391, filed Mar. 13, 2009, now U.S. Pat. No. 8,172,930, titled Cleanable In Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/921,723, filed Oct. 23, 2015, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 17/459,380, filed Jun. 5, 2018, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,142,699, titled Vent Stack Lids and Associated Systems and Methods.
U.S. Appl. No. 13/843,166, now U.S. Pat. No. 9,273,250, filed Mar. 15, 2013, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, titled Methods and Systems for Improved Quench Tower Design.
U.S. Appl. No. 14/655,003, filed Jun. 23, 2015, titled Systems and Methods for Maintaining a Hot Car in a Coke Plant.
U.S. Appl. No. 16/897,957, filed Jun. 10, 2020, titled Systems and Methods for Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 17/190,720, filed Mar. 3, 2021, titled Coke Ovens Having Monolith Component Construction.
U.S. Appl. No. 13/589,009, filed Aug. 17, 2012, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, filed Feb. 16, 2021, titled Automatic Draft Control System for Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.

(56) References Cited

OTHER PUBLICATIONS

U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed Mar. 3, 3021, titled Exhaust Flow Modifier, Duck Intersection Incorporating the Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, titled Integrated Coke Plant Automation and Optimization Using Advanced Control and Optimization Techniques.
U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 17/363,701, filed Jun. 30, 2021, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. No. 10,920,148, titled Improved Burn Profiles for Coke Operations.
U.S. Appl. No. 17/155,219, filed Jan. 22, 2021, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, now U.S. Pat. No. 11,214,739, filed Jan. 6, 2020, titled Method and System for Dynamically Charging a Coke Oven.
U.S. Appl. No. 17/526,477, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, filed Nov. 8, 2021, titled System and Method for Repairing a Coke Oven.
U.S. Appl. No. 17/135,483, filed Dec. 28, 2020, titled Oven Health Optimization Systems and Methods.
U.S. Appl. No. 16/729,053, filed Dec. 27, 2019, titled Oven Uptakes.
U.S. Appl. No. 16/729,201, filed Dec. 27, 2019, titled Gaseous Tracer Leak Detection.
U.S. Appl. No. 16/729,122, filed Dec. 27, 2019, titled Methods and Systems for Providing Corrosion Resistant Surfaces in Contaminant Treatment Systems.
U.S. Appl. No. 16/729,068, filed Dec. 27, 2019, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, titled Coke Plant Tunnel Repair and Flexible Joints.
U.S. Appl. No. 16/729,170, now U.S. Pat. No. 11,193,069, filed Dec. 27, 2019, titled Coke Plant Tunnel Repair and Anchor Distribution.
U.S. Appl. No. 17/532,058, filed Nov. 22, 2021, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,021,655, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, filed Jan. 26, 2022, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 17/388,874, filed Jul. 29, 2021, titled Spring-Loaded Heat Recovery Oven System and Method.
U.S. Appl. No. 17/306,895, filed May 3, 2021, titled High-Quality Coke Products.

\* cited by examiner

SYSTEMS AND METHODS FOR TREATING A SURFACE OF A COKE PLANT

CROSS REFERENCE TO RELATED APPLICATION(S)

The present application claims priority to U.S. Provisional Patent Application No. 62/786,096, titled "SYSTEMS AND METHODS FOR TREATING A SURFACE OF A COKE PLANT," filed Dec. 28, 2018; U.S. Provisional Patent Application No. 62/785,728, titled "GASEOUS TRACER LEAK DETECTION," filed Dec. 28, 2018; U.S. Provisional Patent Application No. 62/786,157, titled "COKE PLANT TUNNEL REPAIR AND FLEXIBLE JOINTS," filed Dec. 28, 2018; and U.S. Provisional Patent Application No. 62/786,194, titled "COKE PLANT TUNNEL REPAIR AND ANCHOR DISTRIBUTION," filed Dec. 28, 2018; the disclosures of which are hereby incorporated by reference in their entireties.

TECHNICAL FIELD

The present technology generally relates to systems for coking coal, and in particular to systems and methods for reducing leaks in a system for coking coal.

BACKGROUND

Coke is a solid carbon fuel and carbon source used to melt and reduce iron ore in the production of steel. Coking ovens have been used for many years to convert coal into metallurgical coke. In one process, coke is produced by batch feeding pulverized coal to an oven that is sealed and heated to very high temperatures for 24 to 48 hours under closely-controlled atmospheric conditions. During the coking process, the finely crushed coal devolatilizes and forms a fused mass of coke having a predetermined porosity and strength. Because the production of coke is a batch process, multiple coke ovens are operated simultaneously.

One style of coke plants includes Horizontal Heat Recovery (HHR) ovens, which have a unique environmental advantage over chemical byproduct ovens based upon a relative operating atmospheric pressure condition inside the oven. HHR ovens operate under negative pressure, whereas chemical byproduct ovens operate at a slightly positive atmospheric pressure. Both oven types are typically constructed of refractory bricks and other materials in which creating a generally airtight environment can be a challenge because small cracks can form in these structures, thereby allowing air to leak in or out of the oven. Cracks may also form in structures fluidly coupled to the ovens, exacerbating the challenge of creating an airtight environment. In coke plants operating under a negative pressure, such cracks may permit uncontrolled air to leak into the system, thereby affecting the overall functionality of the coke plant. And in coke plants operating under a positive pressure, such cracks may permit gases to escape from the plant before being treated, thereby making it more difficult to control the coking conditions and increasing the environmental footprint of the coke plant.

In either system, repairing the ovens and associated structures can be challenging. The ovens are typically not allowed to drop below a thermally-volume-stable temperature (i.e., the temperature above which silica is generally volume-stable and does not expand or contract). Moreover, any material used for repair must be suitable to withstand the coking environment.

DETAILED DESCRIPTION

Figure 1:
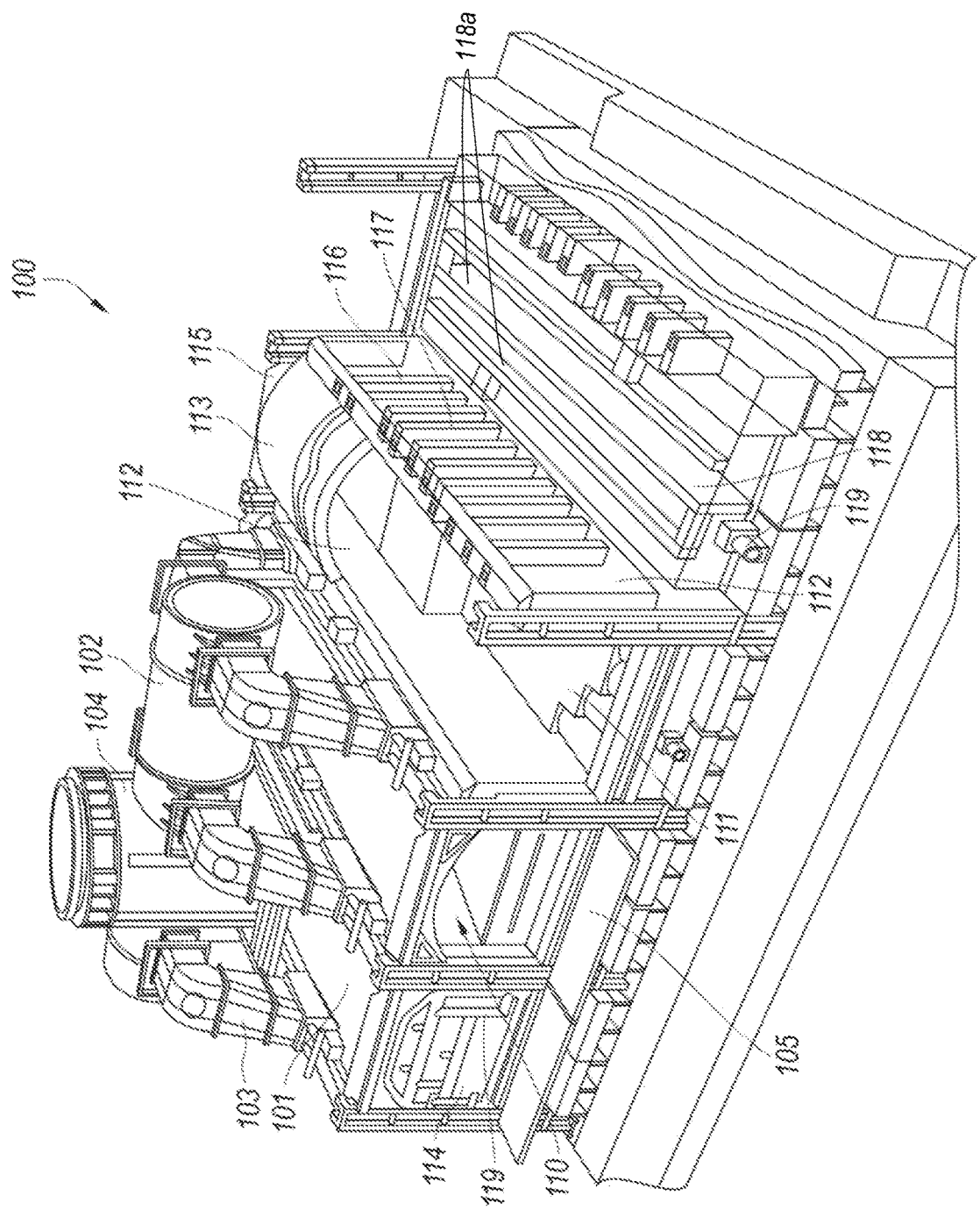
FIG. 1 is an isometric, partial cut-away view of a portion of a horizontal heat recovery coke plant configured in accordance with select embodiments of the present technology.

Several embodiments of the present technology are directed to systems and methods for repairing a surface of a coke plant. In particular, cracks and/or leaks may form in various surfaces that can adversely affect the coke making process and/or the environmental footprint of the coke plant by allowing gases to leak into or out of various structures of the coke plant in an uncontrolled manner. Accordingly, in some embodiments, the present technology provides a patch or seal to at least partially reduce a flow of gas and/or air through a crack or other leak. The patch and/or seal can comprise a substance that can withstand the high-temperatures within the coking environment. In addition, select embodiments of the present technology include a patch or seal that is gunable, flexible, and/or impermeable. For example, the patch can be applied as a flowable substance that is configured to harden once applied. Alternatively, the patch can be applied as a flowable first substance, and a second substance can subsequently or simultaneously be applied to harden the flowable first substance over the crack/leak. As will be described in greater detail below, gunable, flexible, and/or impermeable substances provide various advantages when fixing/sealing cracks or other leaks.

In some embodiments, the present technology includes fixing a surface of a coke plant in a system for coking coal under a negative pressure. The system may have a plurality of coke ovens, a plurality of heat recovery steam generators, and a common tunnel fluidly coupled to the plurality of coke ovens and the plurality of heat recovery steam generators. Due to a variety of reasons, a surface of the system may have one or more cracks that permit an airflow between an external environment and an interior of the system. This may be problematic, for example, because it can make it more difficult to maintain a negative pressure inside the system, can make it more difficult to maintain a suitable temperature for coking coal, and can adversely affect the quality of coke produced by the system. Accordingly, the present technology provides systems and methods for reducing an airflow through one or more cracks in the system. For example, several embodiments of the present technology include a high temperature substance deployed within or over the one or more cracks, thereby reducing an airflow through the one or more cracks when the system is operating under a negative pressure.

Specific details of several embodiments of the disclosed technology are described below with reference to particular, representative configurations. The disclosed technology can be practiced in accordance with coke making systems having other suitable configurations. Specific details describing structures or processes that are well-known and often associated with coke making systems but that can unnecessarily obscure some significant aspects of the present technology are not set forth in the following description for clarity. Moreover, although the following disclosure sets forth some embodiments of the different aspects of the disclosed technology, some embodiments of the technology can have configurations and/or components different than those described in this section. As such, the present technology can include some embodiments with additional elements and/or without several of the elements described below with reference to FIGS. 1-12.

As used herein, the term "crack" refers to any feature that allows or could allow air to flow between a first environment and a second environment. For example, although a crack may fluidly connect the first environment and the second environment, it does not have to do so. Rather, a crack can also refer to any fracture or fissure that does not fluidly connect the first environment and the second environment, but could eventually extend to do so. Likewise, "crack" can encompass other splits that form leaks, such as those that can occur at connective joints. Accordingly, the use of the term "crack" is not limited to a structure having a split or crevice extending fully through it, but rather is intended to broadly encompass any feature that can cause a leak or a potential leak, unless the context clearly dictates otherwise.

Reference throughout this specification to relative terms such as, for example, "approximately" and "about" are used herein to mean the stated value plus or minus 10%. For example, the term "about 100" refers to a range from 90 to 110, inclusive.

Referring to FIG. 1, a coke plant 100 is illustrated which produces coke from coal in a reducing environment. In general, the coke plant 100 comprises at least one oven 101, along with heat recovery steam generators and an air quality control system (e.g. an exhaust or flue gas desulfurization system) both of which are positioned fluidly downstream from the ovens and both of which are fluidly connected to the ovens by suitable ducts. According to aspects of the disclosure, the coke plant can include a heat recovery or a non-heat recovery coke oven, or a horizontal heat recovery or horizontal non-recovery coke oven. The coke plant 100 preferably includes a plurality of ovens 101 and a common tunnel 102 that is fluidly connected to each of the ovens 101 with uptake ducts 103. A cooled gas duct transports the cooled gas from the heat recovery steam generators to the flue gas desulfurization system. Fluidly connected and further downstream are a baghouse for collecting particulates, at least one draft fan for controlling air pressure within the system, and a main gas stack for exhausting cooled, treated exhaust to the environment. Steam lines interconnect the heat recovery steam generators and a cogeneration plant so that the recovered heat can be utilized. The coke plant 100 can also be fluidly connected to a bypass exhaust stack 104 that can be used to vent hot exhaust gasses to the atmosphere in emergency situations.

FIG. 1 illustrates four ovens 101 with sections cut away for clarity. Each oven 101 comprises an oven chamber 110 preferably defined by a floor 111, a front door 114, a rear door 115 preferably opposite the front door 114, two sidewalls 112 extending upwardly from the floor 111 intermediate the front 114 and rear 115 doors, and a crown 113 which forms the top surface of the oven chamber 110. Controlling air flow and pressure inside the oven 101 can be critical to the efficient operation of the coking cycle and therefore the oven 101 includes one or more air inlets 119 that allow air into the oven 101. Each air inlet 119 includes an air damper which can be positioned at any number of positions between fully open and fully closed to vary the amount of primary air flow into the oven 101. In the illustrated embodiment, the oven 101 includes an air inlet 119 coupled to the front door 114, which is configured to control air flow into the oven chamber 110, and an air inlet 119 coupled to a sole flue 118 positioned beneath the floor 111 of the oven 101. Alternatively, the one or more air inlets 119 are formed through the crown 113 and/or in the uptake ducts 103. In operation, volatile gases emitted from the coal positioned inside the oven chamber 110 collect in the crown 113 and are drawn downstream in the overall system into downcomer channels 117 formed in one or both sidewalls 112. The downcomer channels 117 fluidly connect the oven chamber 110 with the sole flue 118. The sole flue 118 can have a plurality of dividing walls 118a that form a circuitous (e.g., serpentine) path through the sole flue 118 beneath the floor 111. Volatile gases emitted from the coal can be combusted in the sole flue 118 as they flow through the circuitous path beneath the floor 111, thereby generating heat to support the reduction of coal into coke. The downcomer channels 117 are fluidly connected to uptake channels 116 formed in one or both sidewalls 112. The air inlet 119 coupled to the sole flue 118 can fluidly connect the sole flue 118 to the atmosphere and can be used to control combustion within the sole flue 118. The oven 101 can also include a platform 105 adjacent to the front door 114 that a worker can stand and walk on to access the front door and the oven chamber 110.

In operation, coke is produced in the ovens 101 by first loading coal into the oven chamber 110, heating the coal in an oxygen depleted environment, driving off the volatile fraction of coal and then oxidizing the volatiles within the oven 101 to capture and utilize the heat given off. The coal volatiles are oxidized within the ovens over a 48-hour coking cycle and release heat to regeneratively drive the carbonization of the coal to coke. The coking cycle begins when the front door 114 is opened and coal is charged onto the floor 111. The coal on the floor 111 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 113. The remaining half of the heat is transferred to the coal bed by conduction from the floor 111, which is convectively heated from the volatilization of gases in the sole flue 118. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

The floor 111, the sidewalls 112, and the crown 113 are typically formed from ceramic bricks (e.g., refractory bricks) capable of withstanding high temperatures and that typically retain heat for an extended period. In some embodiments, the bricks may be formed from a ceramic material that includes silica and/or alumina. The sidewalls 112 can include bricks stacked together in an alternating arrangement and the crown 113 can include bricks arranged in an arch. However, these bricks can be brittle and can sometimes break or crack. For example, striking the bricks (e.g., with a forklift or other machinery, with a tool, etc.) can cause the bricks to fracture. In addition, the bricks can sometimes break due to internal stresses caused by thermal expansion and contraction as the bricks are repeatedly heated and cooled over a prolonged period. The bricks can also break due to differences in temperature between opposing sides of the brick, which can result in internal stresses forming due to the temperature gradient. For example, in the illustrated embodiment, some of the bricks that form the sidewalls 112 can be positioned between the oven chamber 110 and the uptake and downcomer channels 116 and 117 and the differences in temperature between the air in the oven chamber 110 and the air in the uptake and downcomer channels 116 and 117 can sometimes result in these bricks cracking. Other surfaces in the system may also be susceptible to cracking. For example, a surface of the sole flue 118 may also crack or otherwise break due to a variety of reasons described herein. Such cracks may be particularly troublesome to the operation of the system because they may fluidly connect the external environment and the interior of the system. Because the system is configured to operate under a negative pressure and does not include a device configured to control airflow through the cracks, such cracks can allow uncontrolled air to flow into the system.

Figure 2:
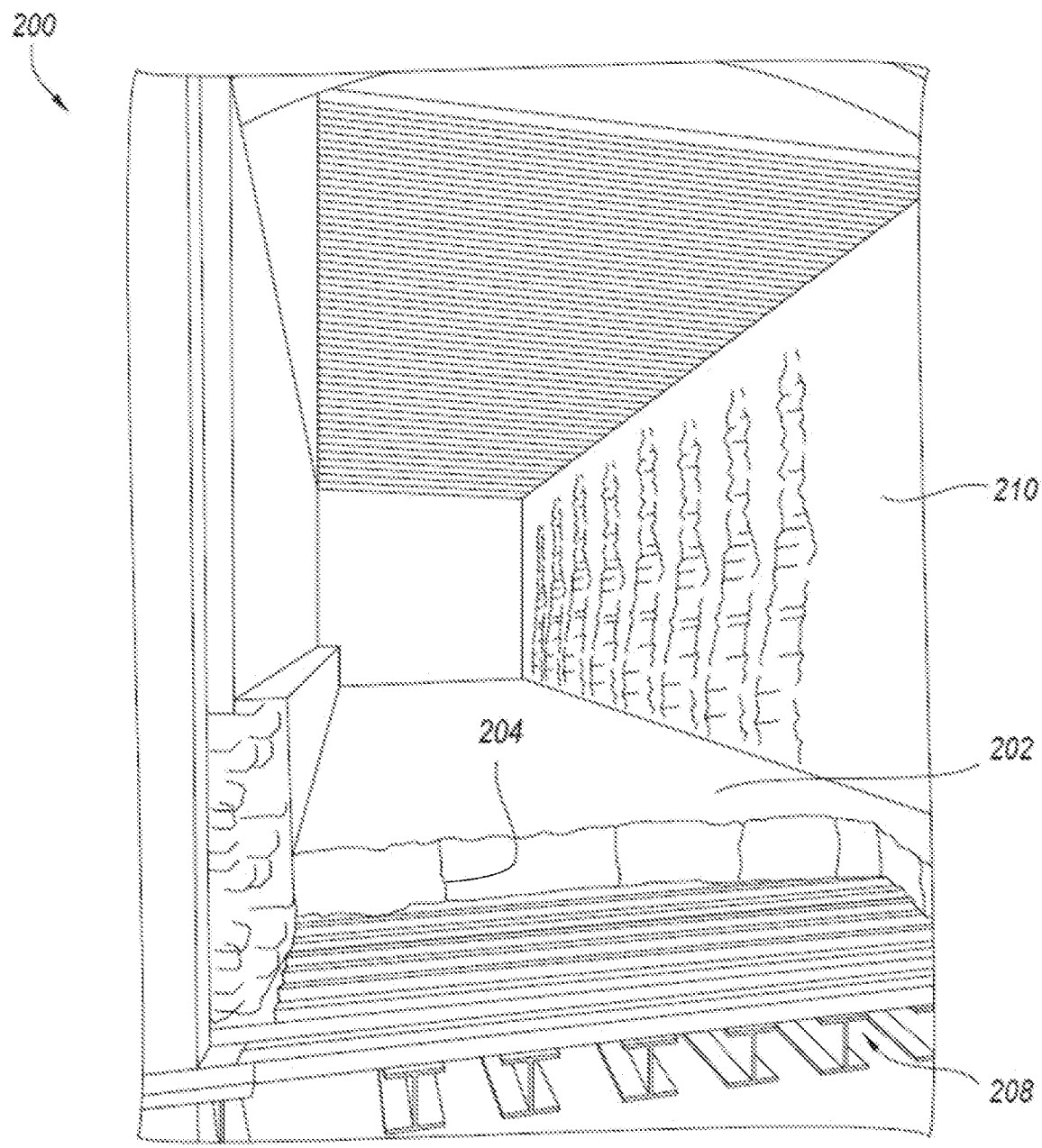
FIG. 2 is an isometric, partial cut away view of a sole flue configured in accordance with select embodiments of the present technology.

FIG. 2 is an isometric, partially cut away view of the sole flue 200. The sole flue 200 may include a surface 202 (e.g., a floor) positioned on top of a corrugated metal sheet 206, which in turn may be positioned on a plurality of beams 208. The sole flue 200 can also include one or more walls 210 extending generally upward to support the oven (not shown). In some embodiments, the sole flue 200 can also include one or more dividing walls (e.g., dividing walls 118a) that create a serpentine gas flow path through the sole flue 200 (see, e.g., FIG. 1). In some embodiments, the surface 202 may be a castable slab of refractory material.

For example, the surface may comprise, silica, alumina, and/or other suitable materials. Regardless of the material, one or more cracks 204 may form in the surface 202. In some embodiments, the one or more cracks may extend from a first external facing edge of the surface 202 to a second internal facing edge of the surface 202, thereby fluidly connecting the external environment to the negatively pressured sole flue 200. Because the system operates under a negative pressure, air from the external environment may be drawn into or otherwise enter the sole flue 200 through the one or more cracks 204. This may be problematic, for example, because it can make it more challenging to maintain a negative pressure inside the system, make it challenging to maintain a suitable temperature for coking coal, and/or adversely affect the quality of coke produced by the system.

Figure 3A:
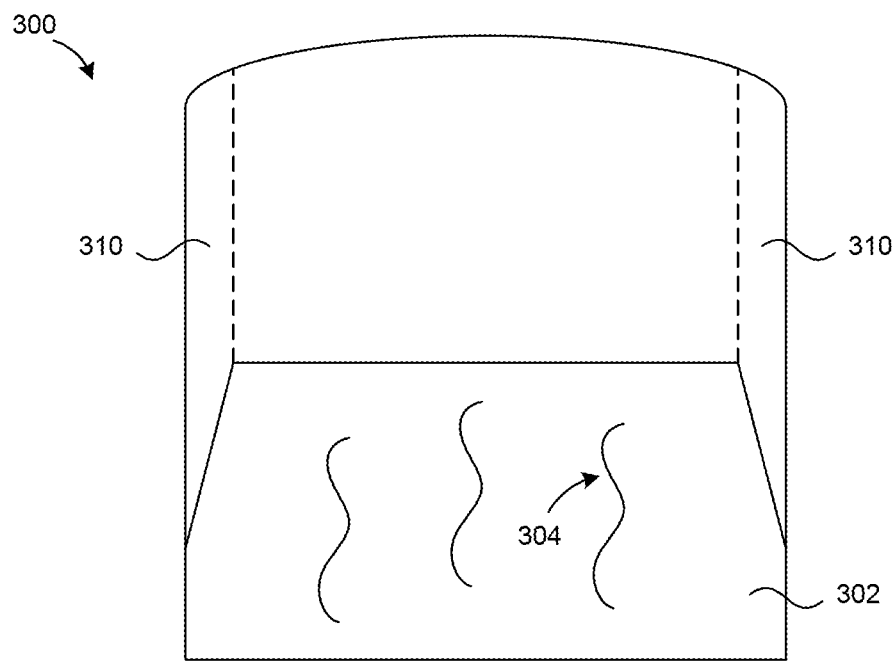
FIGS. 3A-C are front views of a sole flue configured in accordance with one embodiment of the present technology.

FIG. 3A is a front view of a sole flue 300. The sole flue 300 can be generally similar to the sole flue 200. As illustrated, the sole flue 300 includes a surface 302 (e.g., a floor) and two walls 310. The walls 310 can be side walls or dividing walls, as described above with respect to FIGS. 1 and 2. The surface 302 may have one or more cracks 304. The cracks 304 may fluidly connect an external environment with the interior of the sole flue 300, thereby allowing external air to leak into (or out of) the system. In other embodiments, the cracks 304 do not extend fully through the surface 302 but nevertheless can be patched or otherwise treated. The cracks 304 may form in a variety of patterns throughout the surface 302. For example, the cracks 304 may be located only in a first region of the surface 302, while a second region of the surface 302 remains without cracks. In other examples, the cracks 304 may form across generally the entire surface 302. The cracks 304 may also form in two regions: a first region having a higher density of cracks and a second region having a lower density of cracks.

Figure 3B:
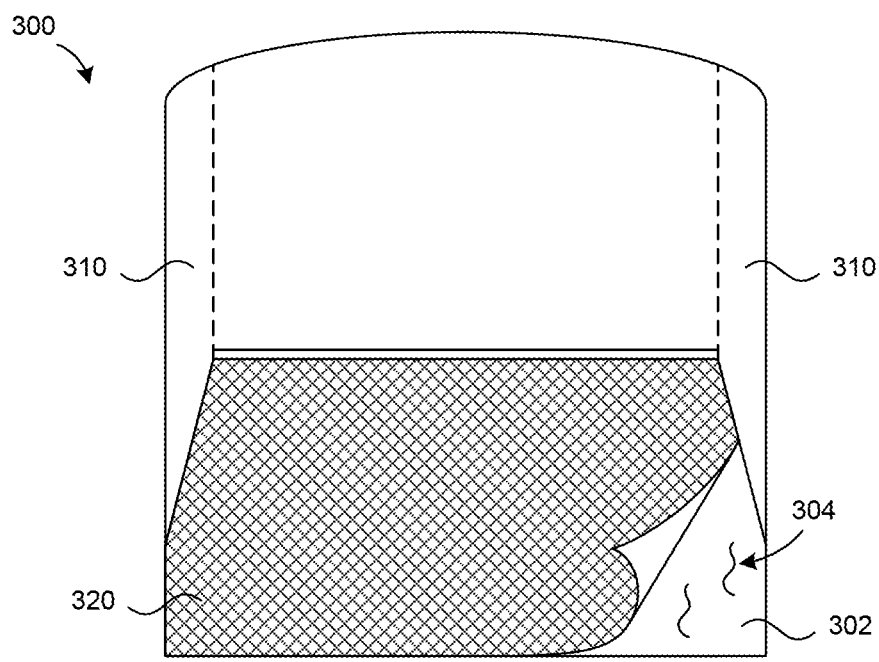
Figure 3C:
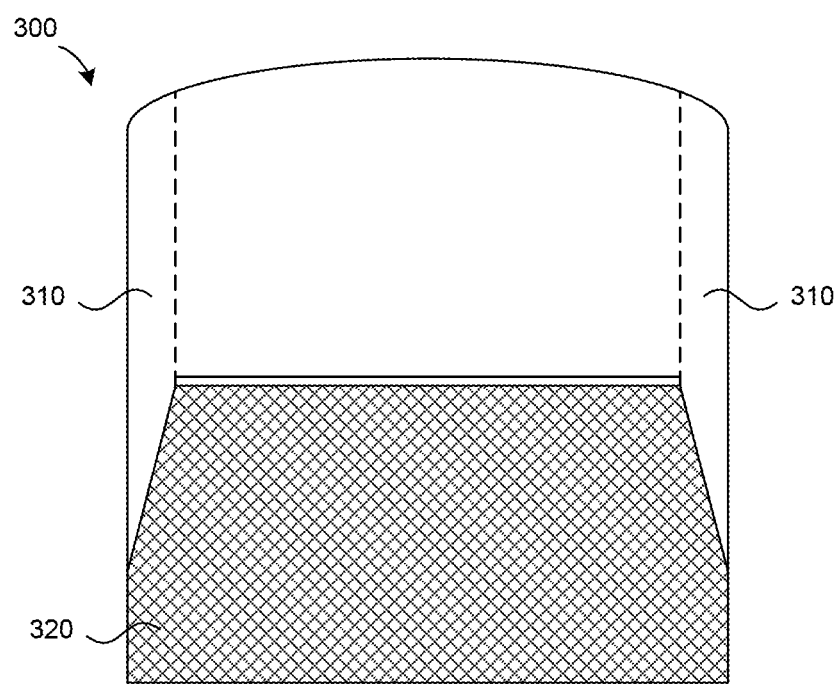

FIGS. 3B and 3C illustrate a patch applied over the surface 302 (e.g., a castable slab) and configured in accordance with embodiments of the present technology. More specifically, a substance 320 is applied over the surface 302 having the one or more cracks 304. The substance 320 acts as a patch and/or seal to reduce airflow through the one or more cracks 304. In FIG. 3B, the substance 320 is shown as applied over the surface 302, with one corner of the substance 320 rolled back to show the one or more cracks 304 that are covered when the substance 320 is fully deployed. FIG. 3C illustrates the substance 320 fully deployed over the one or more cracks 304. As depicted in FIG. 3C, the substance 320 may generally cover the entire surface 302 (e.g., extending between walls 310). In other embodiments, however, the substance 320 only covers a portion of the surface 302. For example, where there is a single region of the surface 302 that has cracks, the substance 320 may be applied over that single region, while uncracked regions do not get covered with the substance 320. In embodiments where an edge of the substance 320 extends to a wall 310 extending from the surface 302, the edge of the substance 320 may optionally be sealed to the wall 310. For example, if the substance 320 extends between two walls 310, a first edge of the substance 320 may be sealed to the first wall 310, and a second edge of the substance 320 may be sealed to a second wall 310. This may further reduce an airflow through the one or more cracks 304 and/or anchor the patch in place. In some embodiments, the substance 320 comprises a material that at least partially binds to the surface 302 to anchor the patch in place.

The substance 320 may be any high temperature substance (e.g., a refractory material suitable for use in high-temperature environments) configured to at least partially reduce an airflow through the one or more cracks 304 when installed over or within the one or more cracks 304. The substance 320 may at least partially seal the one or more cracks 304, may seal the one or more cracks 304, may otherwise block airflow through the one or more cracks 304, and/or may reduce a pressure differential through the one or more cracks 304, thereby reducing the amount of air flowing into the sole flue 300. For example, the substance 320 may reduce gas or air flow through the cracks 304 by 90% or more, 80% or more, 70% or more, 60% or more, 50% or more, etc. The substance 320 may be partially impermeable and/or impermeable to at least partially block airflow through the cracks 304 and/or change a pressure differential through the crack 304. In some embodiments, the substance 320 is flexible or at least partially flexible. By being flexible or at least partially flexible, the substance 320 may retain its sealing effect even if the crack 304 spreads and/or the surface 302 shifts. As previously noted, the substance 320 may also be suitable for use in high temperatures. By being suitable for high temperatures, the substance 320 can retain its properties in the coking environment. For example, in some embodiments, the substance 320 is suitable for use in temperatures of 100 degrees Celsius or higher, 500 degrees Celsius or higher, 1,000 degrees Celsius or higher, and/or 1,500 degrees Celsius or higher.

Accordingly, the substance 320 may comprise a variety of materials. For example, the substance 320 may be a high temperature ceramic material, such as a high temperature ceramic paper, a high temperature ceramic blanket, a high temperature ceramic spray, or a flowable ceramic. Suitable high temperature ceramics include a ceramic material configured to reduce the airflow through the one or more cracks when applied over or within the cracks. Suitable ceramics include, but are not limited to, alumina silicate wool blankets, papers, and sprays such as Kaowool®, Cerablanket®, Cerachem®, Cerachrome®, and Fiberfrax®. The high temperature substance may also be a flowable polymer, a high temperature polymer, a silica material, a fiberglass material, a dust configured to coagulate, a vapor configured to coagulate, insulated furnace brick, a fibrous material, a flexible coating, a hard coating, a sealant, and/or any other suitable substance and/or combinations thereof. Yet other suitable materials include polycrystalline fiber blankets and low biopersistent fiber blankets.

The substance 320 may be applied to the surface 302 through any suitable means. For example, the substance 320 can be gunned (e.g., sprayed), casted, painted, poured, rolled, or otherwise applied to the surface 302. For example, in some embodiments, the substance 320 is a high temperature ceramic blanket or paper that can be rolled over or otherwise applied to a surface having one or more cracks. In other embodiments, the substance 320 is a liquid material, flowable material, dust, vapor, spray, or the like, and may be gunned into or over the one or more cracks 304.

The substance 320 may be applied from either side of the crack (e.g., from the external facing side of the crack or the internal facing side of the crack). For example, the substance 320 can be applied from underneath the surface 302 (not shown), such as from underneath air space beams supporting the sole flue 300 (e.g., air space beams 208 in FIG. 2) or from outside an oven crown (e.g., crown 113 in FIG. 1). Without wishing to be bound by theory, it is expected that applying the patch from an external facing surface of the sole flue 300, such as between the air space beams, enables the use of various flexible and impermeable materials (e.g., polymer sealants) that could not otherwise be used within the sole flue 300 because of the high temperatures found within the sole flue 300. In some embodiments, when applying the substance 320 from the external facing side of the crack in a moveable form (e.g., gaseous, vaporized, liquified, etc.), the substance 320 will be drawn into the crack via the negative pressure differential between the external environment and the internal system. Once in the cracks, the substance 320 can harden or otherwise coagulate, thereby sealing the cracks and/or reducing the airflow through the cracks. Moreover, any of the materials that are suitable for use as substance 320 and described herein may be applied on or from the external facing side, on or from the internal facing side, or on or from both the external and internal facing side. As can be appreciated by one skilled in the art, the material of the substance can be based at least in part on the location of the cracks, the desire to have an internal or external patch, and the method of applying the substance 320 (e.g., gunning, spraying, rolling, etc.). For example, if a user wishes to gun the substance 320 over the surface 302, the user may select a flowable material. If a user wishes to roll the substance 320 over the surface 302, the user may select a paper or blanket-like material. In some embodiments, the specific substance can also dictate how and where the patch is applied.

Without wishing to be bound by theory, it is expected that the patches described herein can, in some embodiments, be applied without interrupting operation of the coke plant (i.e., without taking the coke plant "offline"). In particular, because the various patches described herein can be applied in high temperatures, the present technology enables a user to gun or otherwise apply a patch to one or more cracks during the coking process (e.g., using a water-cooled lance and/or a long pipe inserted into the desired chamber). Not having to take the coke plant offline to repair the cracks/leaks may, among other things, lower the cost of repairing cracks or leaks, avoid a disruption in coke production, and/or avoid causing damage to the ovens by avoiding a temperature drop below a thermally-volume-stable value. In other embodiments, one or more ovens may be taken offline while the remainder of the ovens remain online (i.e., operational). In some embodiments, the patches described herein are applied to a surface at an operational temperature. In some embodiments, the patches described herein are applied while keeping a temperature within one or more regions of the coke plant (e.g., within the coke ovens and/or sole flue) 100 degrees Celsius or higher, 500 degrees Celsius or higher, 1,000 degrees Celsius or higher, 1,200 degrees Celsius or higher, and/or 1,500 degrees Celsius or higher. In yet other embodiments, the patches described herein can be applied to a coke plant during the initial construction of the plant.

Some embodiments of the present technology further include treating the substance 320 with a rigidizer and/or sealant. When applied, the rigidizer may reduce the permeability of the substance 320, thereby reducing the airflow through the one or more cracks. For example, if the substance 320 is Kaowool®, a Kaowool® rigidizer may be applied to decrease the permeability of the substance 320. The rigidizer can be applied separately from the substance 320 or concurrent with the substance 320. In some embodiments, the rigidizer is mixed with the substance 320 before the substance 320 is applied over the one or more cracks 304. In addition to or in lieu of the rigidizer, some embodiments of the present technology further include applying a refractory sealant coat over the substance 320.

Accordingly, the high temperature substance may also be a layered material. For example, the high temperature substance may include two, three, four, or more layers. The layers may comprise the same or different substance, or a combination of the same and/or different substances. Each layer may comprise, for example, a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, insulated furnace brick, a fibrous material, a flexible coating, a hard coating, a sealant, or any other suitable substance and/or combinations thereof. For example, in one embodiment having two layers, the first layer (e.g., the layer in apposition with the cracked surface) is a flexible high temperature ceramic blanket, high temperature ceramic paper, or a high temperature ceramic spray, and the second layer is insulated furnace brick. In another embodiment, the first layer is a gunable flexible substance, and the second layer is a hard coating that can act as a refractory sealant. In some embodiments, the various layers are combined into a unitary layered material before being deployed over the cracked surface. In other embodiments, single layers may be sequentially deployed, such that a first substance is deployed over the cracked surface and a second substance is subsequently deployed over the first substance. FIGS. 4A-7C, described below, depict various configurations of a layered high temperature cover. One skilled in the art will recognize a variety of potential configurations of layering based on the disclosures herein. Such configurations are within the scope of the present technology.

Figure 4A:
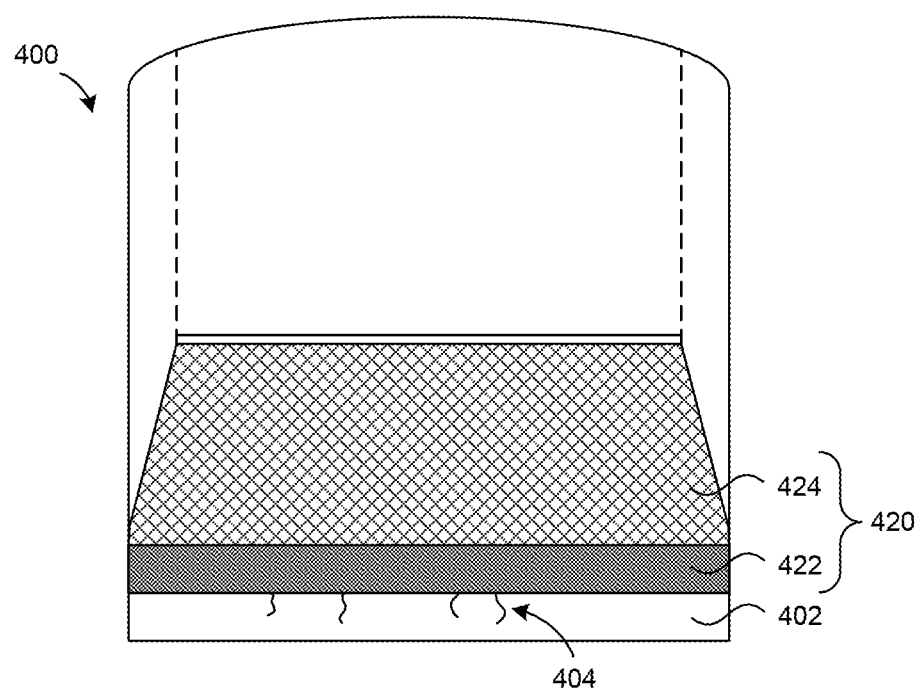
FIG. 4A is a front view of a sole flue configured in accordance with another embodiment of the present technology.
Figure 4B:
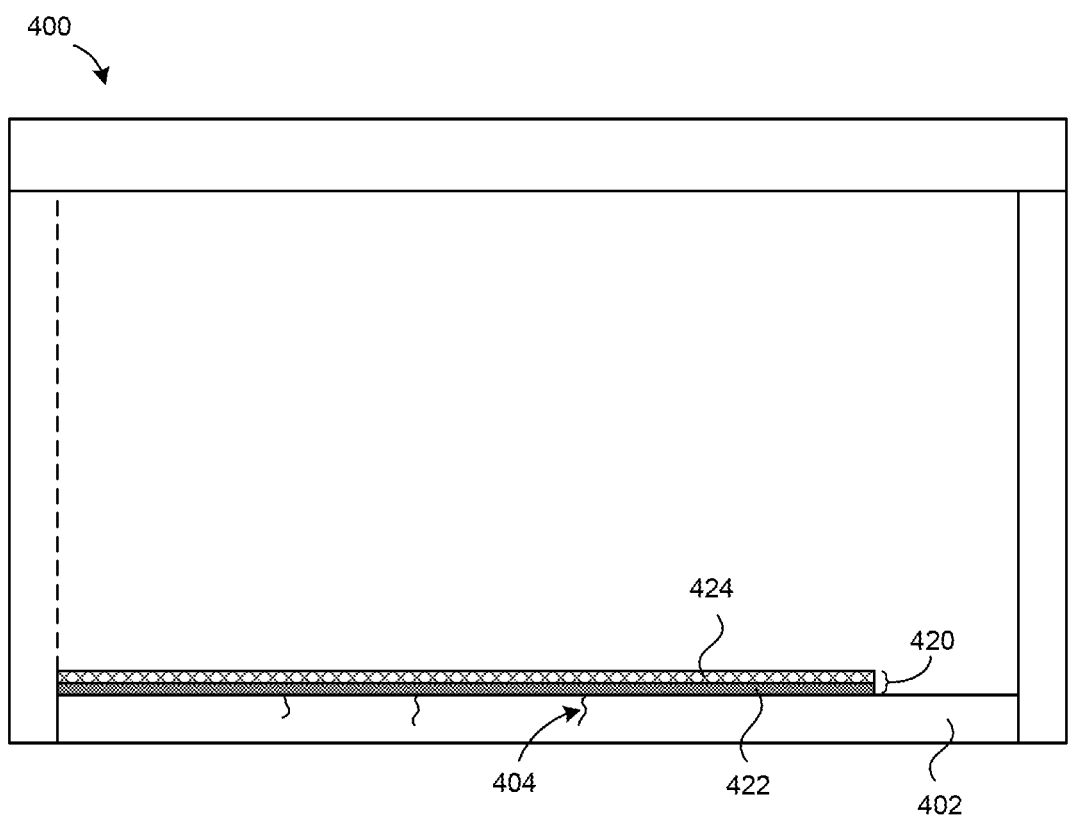
FIG. 4B is a cross sectional side view of the sole flue depicted in FIG. 4A.

FIGS. 4A and 4B illustrate an embodiment of the present technology including a sole flue 400, a surface 402, a high temperature patch 420, and one or more cracks 404 extending beneath the high temperature patch 420. FIG. 4A is an isometric view of the sole flue 400 with a partial cut away view of the high temperature patch 420, and FIG. 4B is a cross-sectional view of the sole flue 400 with the high temperature patch 420. As depicted, the high temperature patch 420 includes a first layer or substance 422 in apposition with the surface 402, and a second layer or substance 424 positioned on the first layer 422, such that the first layer 422 is in between the surface 402 and the second layer 424. The high temperature patch 420 is shown in a partial cut away view to illustrate that the first layer 422 is underneath the second layer 424 (e.g., between the surface 402 and the second layer 424). However, the first layer 422 may extend to completely cover the cracks 404, and the second layer 424 may extend to cover all of the first layer 422. While depicted as discrete layers, the first substance 422 and the second substance 424 do not necessarily form discrete layers in some embodiments. Rather, in some embodiments, the first substance 422 and the second substance 424 can mix together to form the patch 420.

As discussed above, the first layer 422 and the second layer 424 may be the same or different material. Each layer may comprise, for example, a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, insulated furnace brick, a fibrous material, a flexible coating, a hard coating, a sealant, or any other suitable substance and/or combinations thereof. For example, in one embodiment, the first layer 422 is a high temperature ceramic material and the second layer 526 is insulated furnace brick. In some embodiments, the first layer 422 is a flexible layer and the second layer 526 is a hard coating or rigid layer. For example, the first layer 422 can be a Kaowool® mixture that is gunned over the surface 402. The second layer 424 can be brick and/or a rigidizer that is subsequently applied over the first layer 422.

Figure 5A:
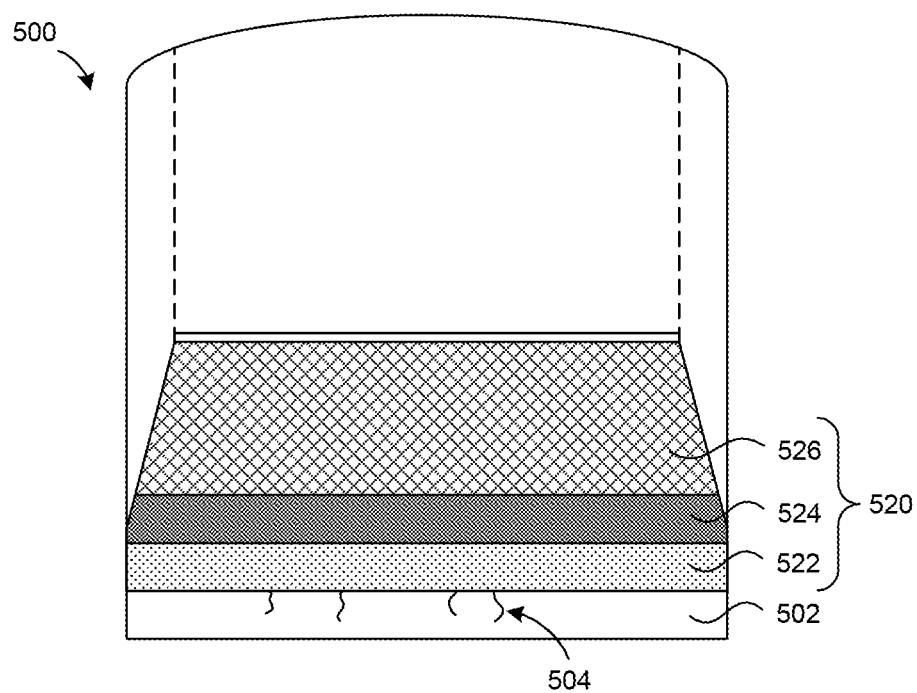
FIG. 5A is front view of a sole flue configured in accordance with another embodiment of the present technology.
Figure 5B:
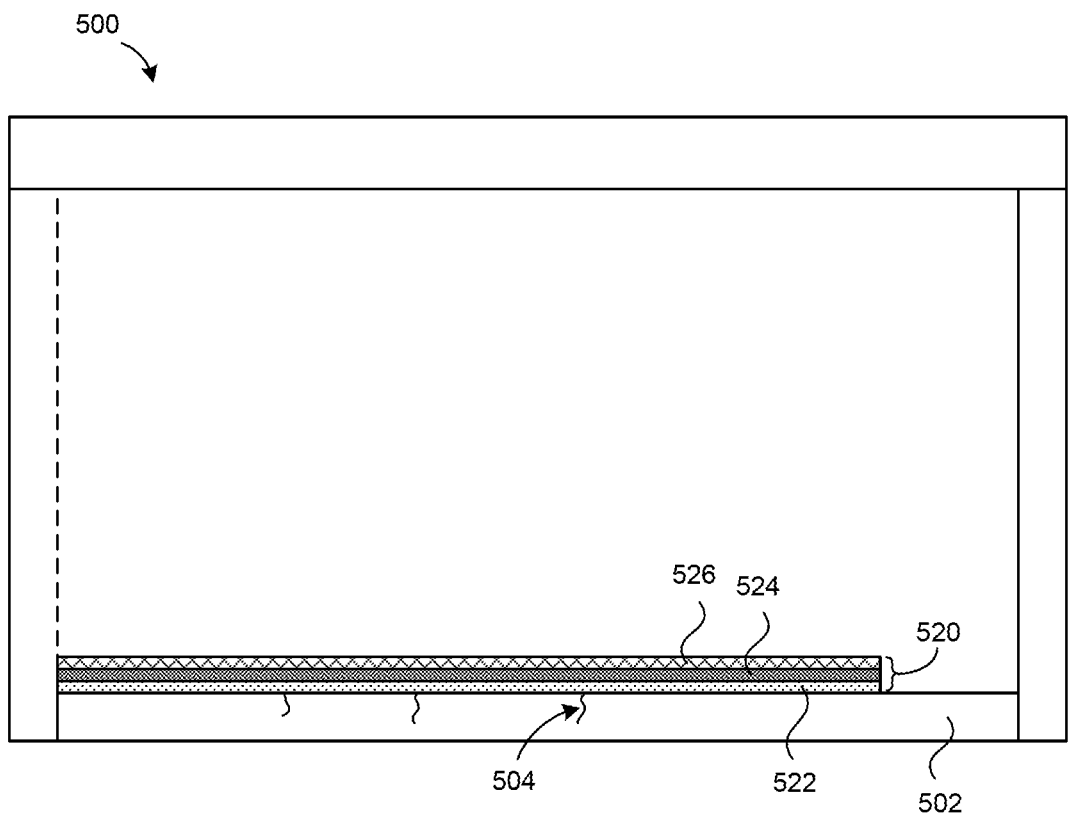
FIG. 5B is a cross sectional side view of the sole flue depicted in FIG. 5A.

FIGS. 5A and 5B illustrate another embodiment of the present technology including a sole flue 500, a surface 502, one or more cracks 504 in the surface, and a high temperature patch 520 applied over the one or more cracks. FIG. 5A is an isometric view of the sole flue 500 with a partial cut away view of the high temperature patch 520, and FIG. 5B is a cross-sectional view of the sole flue 500 with the high temperature patch 520. As depicted, the high temperature patch 520 includes a first layer or substance 522 in apposition with the surface 502, a second layer or substance 524 positioned on top of the first layer 522, and a third layer or substance 526 positioned on top of the second layer 524, such that the second layer 524 is between the first layer 522 and the third layer 526. The high temperature patch 520 is shown in a partial cut away view to illustrate that the first layer 522 is underneath the second layer 524, and that the second layer 524 is underneath the third layer 526. However, in certain embodiments, the third layer 526 and second layer 524 will extend to the front edge of the first layer 522, such that the first layer 522, second layer 524, and third layer 526 cover generally the same surface area of the surface 502. In other embodiments, the first layer 522, second layer 524, and third layer 526 may be overlapping but staggered, such that the first layer 522, second layer 524, and third layer 526 cover overlapping but different surface areas of the surface 502.

As discussed above, the first layer 522, the second layer 524, and the third layer 526 may be the same or different material. Each layer may comprise, for example, a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, insulated furnace brick, a fibrous material, a flexible coating, a hard coating, a sealant, or any other suitable substance and/or combinations thereof. For example, in one embodiment, the first layer 522 and the third layer 526 are a high temperature ceramic blanket, and the second layer 524 is a silica material.

Figure 6A:
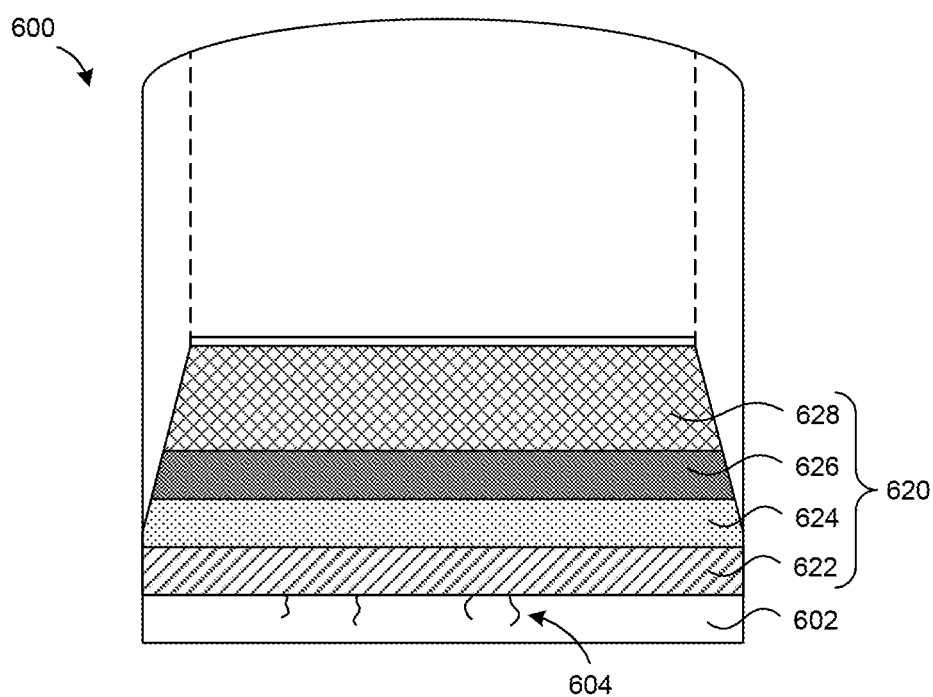
FIG. 6A is front view of a sole flue configured in accordance with another embodiment of the present technology.
Figure 6B:
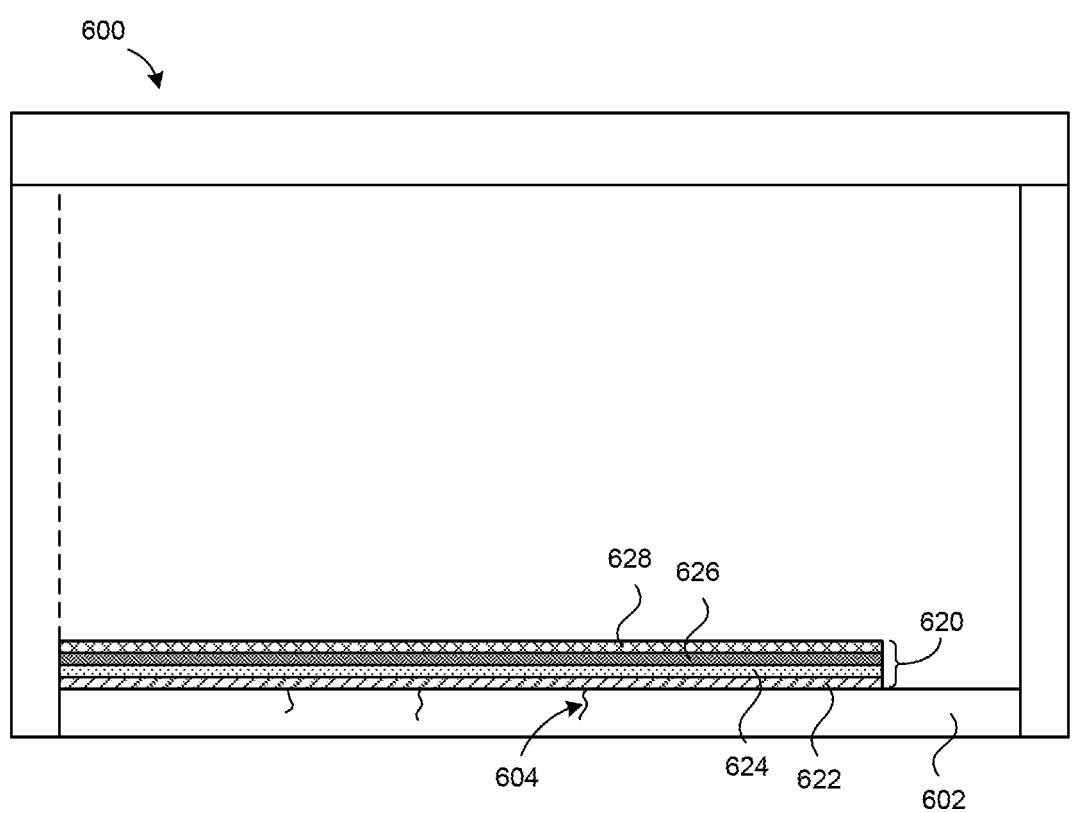
FIG. 6B is a cross sectional side view of the sole flue depicted in FIG. 6A.

FIGS. 6A and 6B illustrate another embodiment of the present technology including a sole flue 600, a surface 602, one or more cracks 604 in the surface, and a high temperature patch 620 applied over the one or more cracks. FIG. 6A is an isometric view of the sole flue 600 with a partial cut away view of the high temperature patch 620, and FIG. 6B is a cross-sectional view of the sole flue 600 with the high temperature patch 620. As depicted, the high temperature patch 620 includes a first layer or substance 622 in apposition with the surface 602, a second layer or substance 624 positioned on the first layer 622, a third layer or substance 626 positioned on the second layer 624, and a fourth layer or substance 628 positioned on the third layer 626. The high temperature patch 620 is shown in a partial cut away view to illustrate that the first layer 622 is underneath the second layer 624, that the second layer 624 is underneath the third layer 626, and that the third layer 626 is underneath the fourth layer 628. However, in certain embodiments, the fourth layer 628, third layer 626, and second layer 624 will extend to the front edge of the first layer 622, such that the first layer 622, second layer 624, third layer 626, and fourth layer 628 cover generally the same surface area of the surface 602. In other embodiments, the first layer 622, second layer 624, third layer 626, and fourth layer 628 may be overlapping but staggered, such that the first layer 622, second layer 624, third layer 626, and fourth layer 628 cover overlapping but different surface areas of the surface 602.

As discussed above, the first layer 622, the second layer 624, the third layer 626, and the fourth layer 628 may be the same or different material. Each layer may comprise, for example, a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, insulated furnace brick, a fibrous material, a flexible coating, a hard coating, a sealant, or any other suitable substance and/or combinations thereof.

Figure 7A:
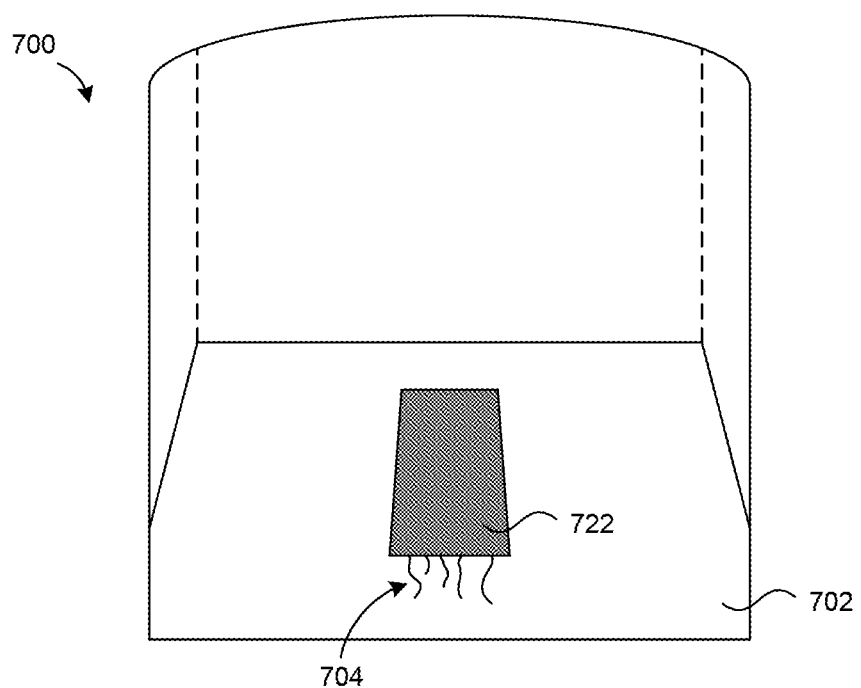
FIGS. 7A-B are front views of a sole flue configured in accordance with one embodiment of the present technology.
Figure 7B:
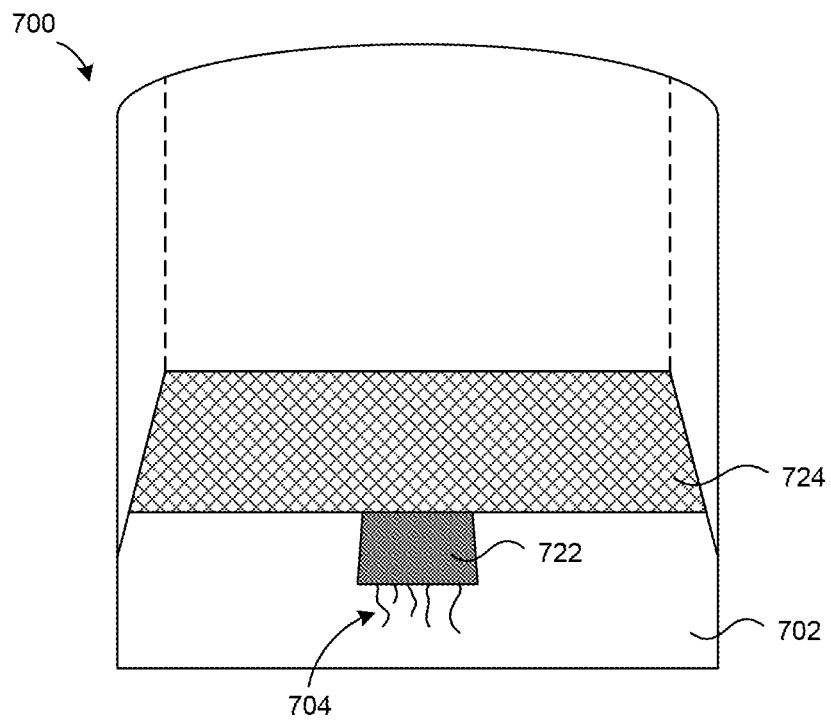
Figure 7C:
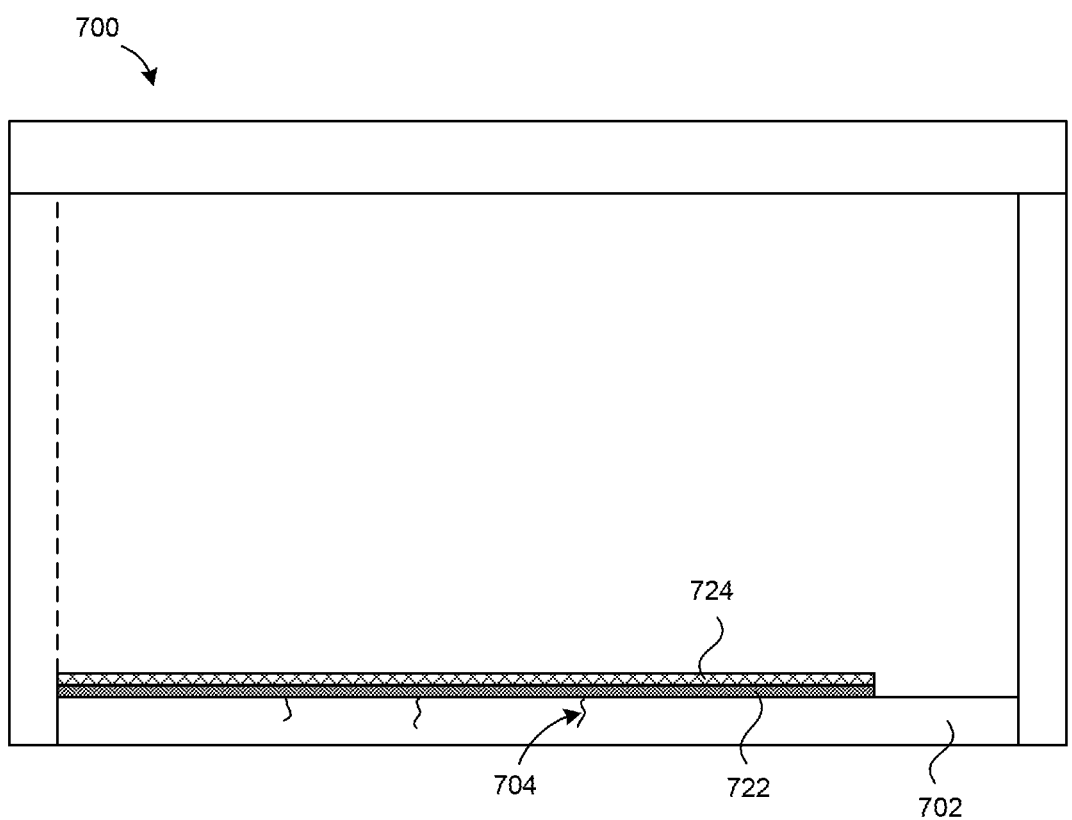
FIG. 7C is a cross sectional side view of the sole flue depicted in FIG. 7B.

FIGS. 7A-C illustrate yet another embodiment of the present technology. In FIG. 7A, a first substance 722 has been applied over a first region of the surface 702 having a high density of cracks. The first substance 722 may be any high temperature substance disclosed herein and configured to reduce an airflow through the one or more cracks. Pretreating the one or more cracks in the high-density region with a first substance 724 may increase the reduction in airflow through the cracks when a second substance 724 is applied over the first substance 722 722. In FIG. 7B, a second substance 724 has been applied over the first substance 722. Unlike the first substance 722, the second substance 724 covers the entire surface 702. The second substance 724 may be any high temperature substance disclosed herein and configured to reduce an airflow through the one or more cracks. FIG. 7C is a cross-sectional view of the first substance 722 and second substance 724, depicting that the first substance 722 may extend underneath and along a length of the second substance 724. In some embodiments, the first substance 722 is applied over the entire surface 702, and the second substance 724 is applied only to the first region of the surface 702 having the high density of cracks.

Figure 8A:
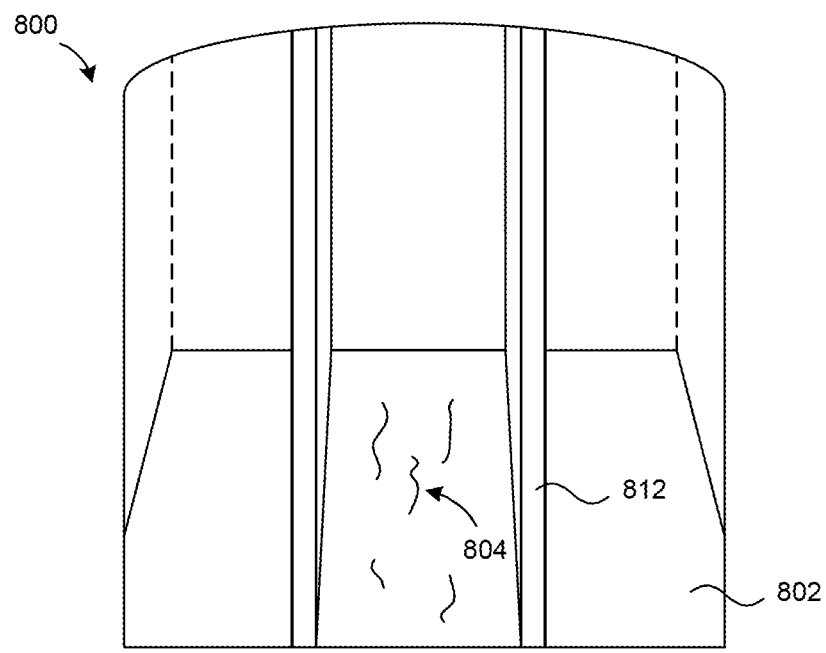
FIGS. 8A-B are front views of a sole flue configured in accordance with another embodiment of the present technology.
Figure 8B:
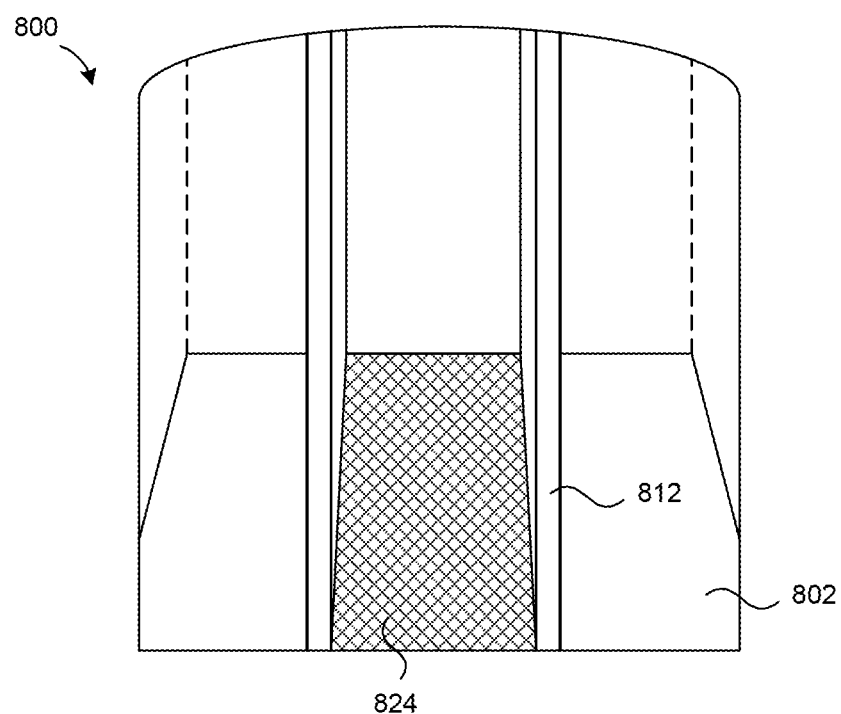

FIGS. 8A and 8B illustrate another embodiment of the present technology. In FIGS. 8A and 8B, a plurality of dividers 812 extend upwardly from the surface 802, dividing the sole flue 800 into several regions. The regions are fluidly connected and, when the coke system is operating, direct flue gas in a serpentine route underneath the coke oven. As illustrated in FIG. 8A, one or more cracks 804 may form between the plurality of dividers 812. As described with respect to FIGS. 2-7 above, the cracks 804 may permit an airflow between an external environment and the sole flue 800. Accordingly, FIG. 8B illustrates a substance 820 installed over the one or more cracks 804 and extending between two dividers 812. In some embodiments, the substance 820 may extend from one edge of a divider to a second edge of a divider. In other embodiments, the substance 820 may just cover a region of the surface 302 having the one or more cracks. The substance 820 may be any substance described above with respect to FIGS. 3-7. For example, the substance 820 may be a high temperature ceramic material, such as a high temperature ceramic paper, a high temperature ceramic blanket, a high temperature ceramic spray, or a flowable ceramic. The substance 820 may also be a flowable polymer, a high temperature polymer, a silica material, a dust configured to coagulate, a vapor configured to coagulate, insulated furnace brick, a fibrous material, a flexible coating, a hard coating, a sealant, or any other suitable substance. Furthermore, the substance 820 may include two, three, four, or more layers. Each layer may be the same or different substance. Each layer may comprise, for example, a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, insulated furnace brick, a fibrous material, a flexible coating, a hard coating, a sealant, or any other suitable substance and/or combinations thereof.

Figure 9A:
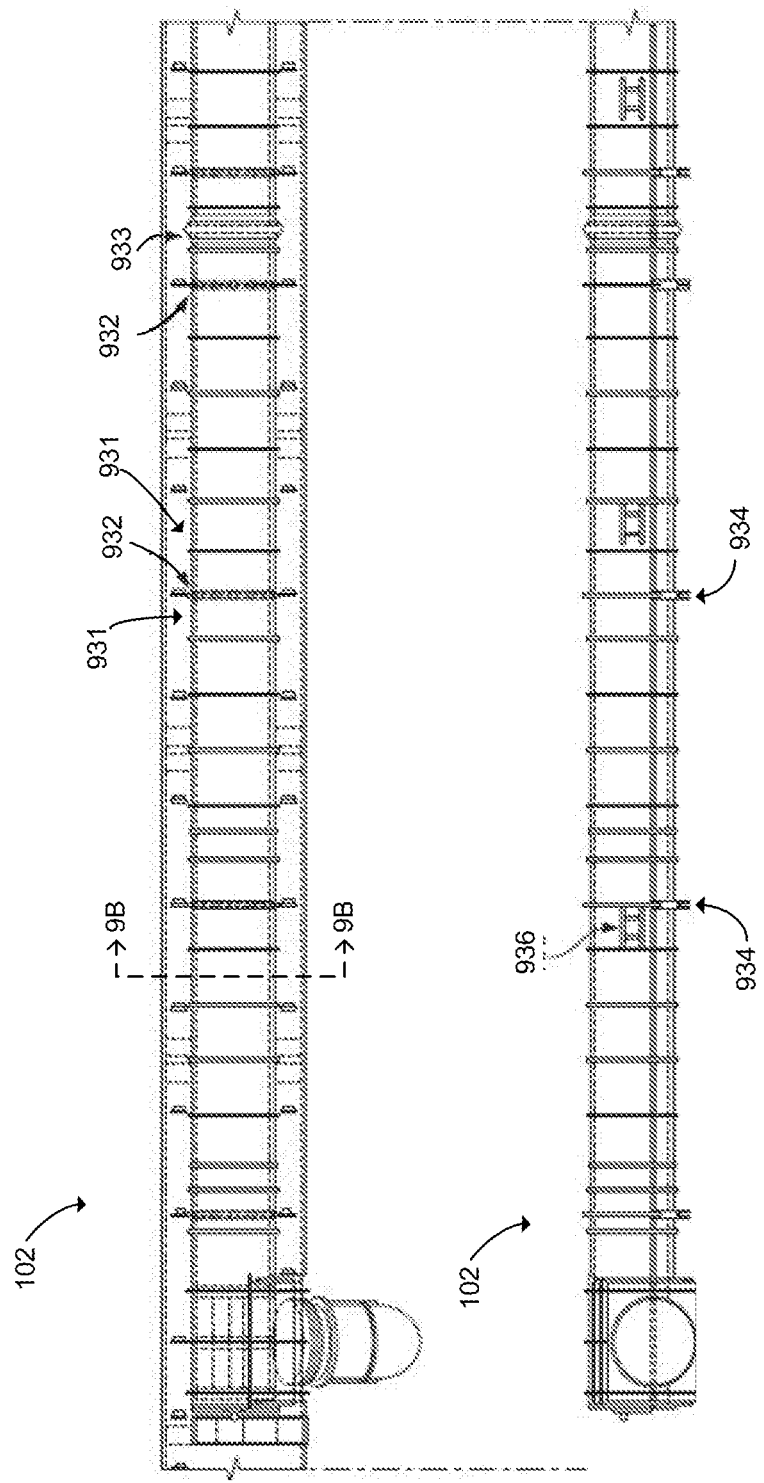
FIG. 9A is a top and side plan view of a portion of a common tunnel of the coke plant of FIG. 1.
Figure 9B:
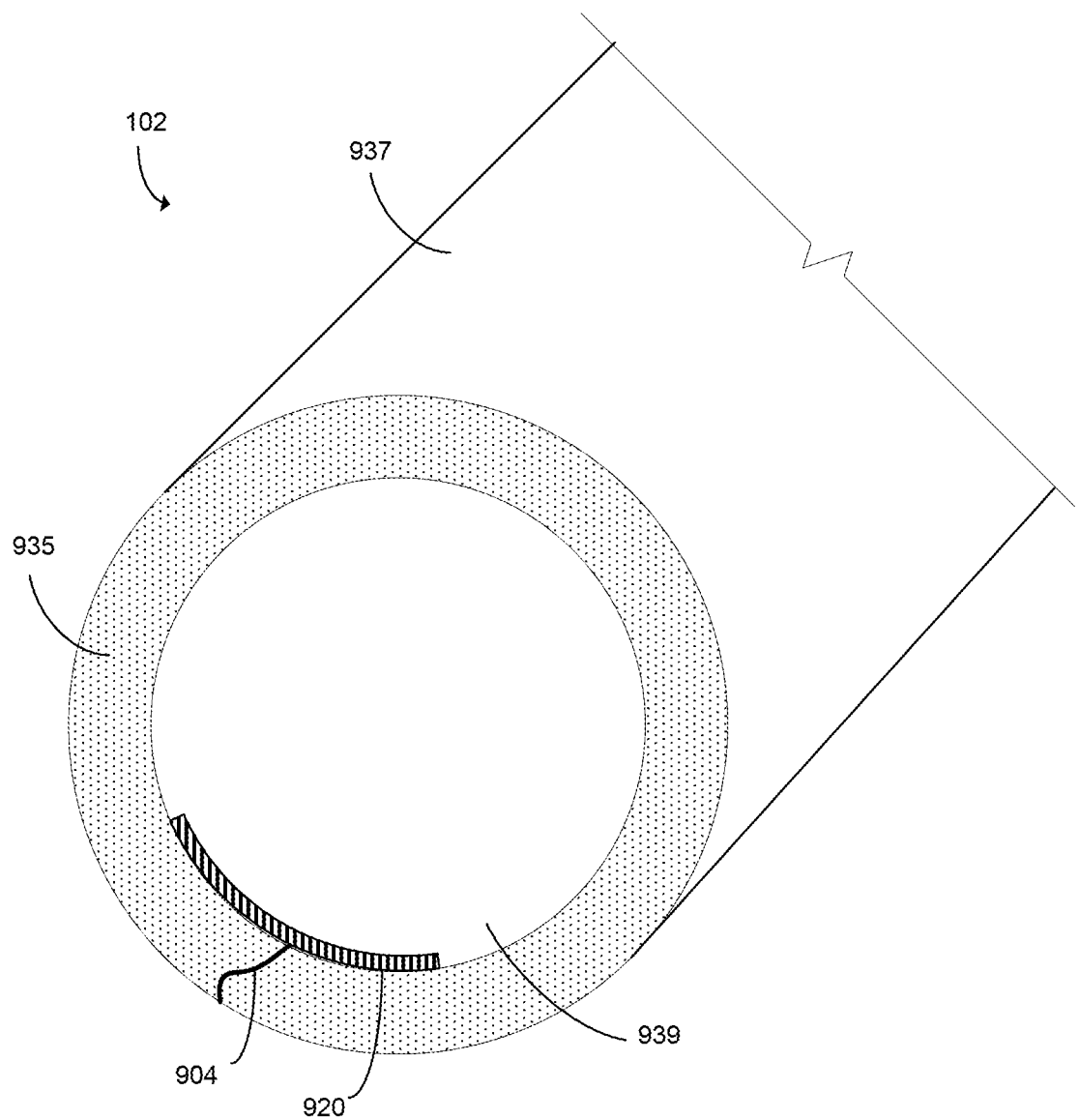
FIG. 9B is a longitudinal cross-sectional view of the portion of the common tunnel of FIG. 9A, and depicts a patch at least partially sealing a crack extending through a portion of the common tunnel and configured in accordance with select embodiments of the present technology.

FIGS. 9A and 9B illustrate another application of embodiments of the present technology. FIG. 9A is a top view and side view of portions of the common tunnel 102, illustrated previously in FIG. 1. As illustrated, the common tunnel 102 is a generally cylindrical duct have consecutive tunnel portions 931. The common tunnel 102 can further include one or more joints 932. The joints 932 can define interfaces between consecutive tunnel portions 931. In some embodiments, one or more of the joints are flexible joints 933. The flexible joints 933 can be configured to flex in response to stresses on the tunnel 102. As used in this context, "flex" of the tunnel 102 includes movement of adjacent tunnel portions 931 with respect to each other in an axial, rotational, and/or bending manner. Despite this flexion, portions of the tunnel 102 may still be susceptible to cracking or forming other leaks. In some embodiments, the lengths of the tunnel portions 931 between the joints 932 is approximately ten to one hundred feet. In some embodiments, the common tunnel 102 or other tunnel/conduit includes a joint 932 or flexible joint 933 at a maximum of every fifteen feet, every twenty feet, every thirty feet, every forty five feet, every sixty feet, every ninety feet, and/or every one hundred feet. In some embodiments, one or more braces 934 can be used to support the tunnel 102. The braces 934 can be positioned along the length of the tunnel 102 under joints 932 and/or between joints 932. Certain aspects of the tunnel 902 can be generally similar to certain aspects of the common tunnels described in U.S. Provisional Patent Application No. 62/786,157, the disclosure of which was previously incorporated by reference herein.

FIG. 9B is a longitudinal cross-sectional view of the tunnel 102 taken along the axis labeled 9B in FIG. 9A. As best illustrated in FIG. 9B, the tunnel 102 includes elongated and/or tubular structural element 935 having an outer surface 937. An inner surface of the structural element 935 defines a lumen 939 for receiving gases from the ovens 101 and/or sole flue 118 via the uptake ducts 103 (FIG. 1). As illustrated, one or more cracks 904 may form in the structural element 935. If the crack 904 extends between the outer surface 937 and the inner lumen 939, the crack 904 may allow ambient air to enter the tunnel 102 and/or gases to escape the tunnel. As described at length herein, allowing air to flow into the system in an uncontrolled manner can, among other things, adversely affect the coke making process. Accordingly, the present technology provides a substance 920 that can be applied as a patch to seal the crack 904. As described at length herein, the substance 920 can comprise a high temperature substance configured to reduce an airflow through the crack 904. Although illustrated as being applied on an internal facing surface of the tunnel 102, the substance 920 can also be applied on the external facing surface 937 and/or can be gunned, sprayed, or otherwise applied within the crack 904 itself. Additionally, although not shown, leaks may also form at or adjacent to the joints 932. Accordingly, the substance 920 can be applied at the joints 932 to reduce and/or prevent airflow through leaks at the joints 932.

The substance 920 may comprise a variety of materials (e.g., any of the materials described above). For example, the substance 920 may be a high temperature ceramic material, such as a high temperature ceramic paper, a high temperature ceramic blanket, a high temperature ceramic spray, and/or a flowable ceramic. Suitable high temperature ceramics include a ceramic material configured to reduce the airflow through the one or more cracks when applied over or within the cracks. Suitable ceramics include, but are not limited to, alumina silicate wool blankets, papers, and sprays such as Kaowool®, Cerablanket®, Cerachem®, Cerachrome®, and Fiberfrax®. The high temperature substance may also be a flowable polymer, a high temperature polymer, a silica material, a dust configured to coagulate, a vapor configured to coagulate, insulated furnace brick, a flexible coating, a fibrous material, a hard coating, a sealant, and/or any other suitable substance, and/or combinations thereof. Other suitable materials include polycrystalline fiber blankets and low biopersistent fiber blankets. Additionally, substance 920 can be layered, as described above with respect to FIGS. 4A-7C.

As can be appreciated from the above embodiments, a high temperature substance or patch in accordance with the present technology may include a variety of layers of varying compositions, and may be installed over a variety of regions on a surface having one or more cracks. Therefore, the present technology is not limited to the explicit combinations disclosed herein. Instead, one skilled in the art will recognize from the disclosure herein that a variety of compositions may be utilized to build a layered, high temperature patch in accordance with the present technology.

Moreover, from the above disclosure, one skilled in the art will recognize the present technology may be employed to reduce airflow through a crack or leak in a variety of surfaces in a coke plant. For example, the present technology may be useful for treating cracks or leaks located in a sole flue floor, in an oven crown, in a common tunnel, in a heat recovery steam generator, on a charging/pushing ramp, and/or in any location where a crack or leak could form. The patches described herein can be applied on internal, external, and/or internal and external facing surfaces of the foregoing structures. The above disclosure, therefore, does not limit the present technology to deployment on surfaces explicitly discussed herein.

Additionally, although primarily described with respect to fixing cracks in coke plants configured to operate under negative pressure relative to the external environment, such as heat recovery coke plants, the present technology can be applied to fix leaks in other types of coke plants including those configured to operate under positive pressure, such as byproduct coke plants and the like. Reducing leaks in such plants using the present technology may, among other advantages, (i) facilitate greater control over the coke making process, (ii) allow the ovens to operate at a higher temperature, and/or (iii) reduce the environmental footprint of the coke plant by reducing the amount of untreated gases leaking out of the system.

The present technology may also be applied to patch leaks in systems other than coke plants. In particular, the present technology can be used to patch leaks in any system operating under negative pressure and/or high temperatures. For example, the present technology can be used to patch leaks in process furnace systems, combustion systems, pyro scrubber systems, and the like.

Likewise, the present technology may be employed to reduce airflow through a crack or leak on any surface that undergoes thermal expansion and/or thermal contraction. In such embodiments, the patching substance may be strategically selected to have increased flexibility to account for the expansion and/or contraction. In some embodiments, the surface is a metal surface, and the patching substance provides a "metal coating" that prevents unwanted airflow through joints or other leaks on the metal surface. In some embodiments, the substance applied as a patch over the metal surface can optionally be secured in place. In other embodiments, the substance applied as a patch is at least partially self-anchoring.

In some embodiments, the present technology can be used as a preventative measure. For example, patches in accordance with the present technology can be applied over cracks that do not fully extend through a surface and therefore do not permit gases to flow between two separate environments on either side of the surface. In addition, patches may be applied to other areas, such as connective joints, that may be prone to leakage. In some embodiments, the patches may be applied during initial construction of a coke plant.

The present technology also includes methods for reducing an airflow through one or more cracks and/or leaks in a surface of a system for coking coal. Select aspects of several methods in accordance with the present technology are described below with respect to FIGS. 10-12. However, as one skilled in the art will appreciate, the present technology is not limited to the aspects explicitly described herein. Rather, the present technology encompasses any method suitable for deploying the patches described herein.

Figure 10:
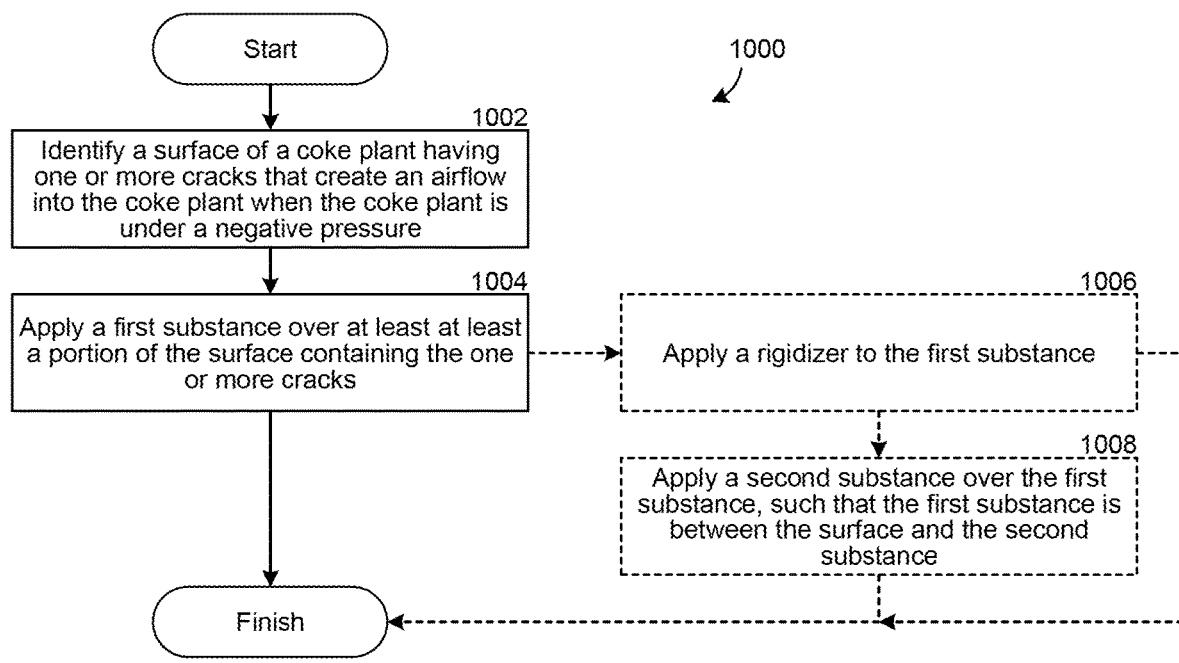
FIG. 10 is a flow diagram of a method of reducing an airflow through one or more cracks in a surface of a system for coking coal in accordance with select embodiments of the present technology.

FIG. 10 is a flow chart of a method 1000 for reducing an airflow through one or more cracks in a surface of a system configured to coke coal under a negative pressure. The method 1000 can include identifying a first region of the coking system having one or more cracks that permit an airflow into the system when the system is under a negative pressure (process step 1002). The cracks may be identified in a number of different manners. For example, the cracks may be identified by observing that a coke oven in the system does not operate at a generally normal temperature (e.g., it runs cooler than it should). This may indicate that uncontrolled air is leaking into the system. The cracks may also be identified by observing a reduced level of control over the amount of air entering the system. As previously discussed with respect to FIG. 1, controlling air flow and pressure inside the coke oven can be important to the efficient operation of the coking cycle and therefore the coke ovens may include one or more air inlets that allow air into the coke ovens. Importantly, each air inlet includes an air damper which can be positioned at any number of positions between fully open and fully closed to vary the amount of primary air flow into the coke oven. When uncontrolled air is flowing into the system through the cracks, control over the air entering the system can be reduced. Yet another potential mechanism for identifying cracks is to use a gaseous tracer leak detector test (e.g., a pulse tracer test) or a smoke bomb test. Embodiments of a gaseous tracer leak detector test are described in the U.S. Provisional Patent Application No. 62/785,728 titled "Gaseous Tracer Leak Detection", filed Dec. 28, 2018, the disclosure of which was previously incorporated by reference herein. In a gaseous tracer leak detector test, a gaseous tracer is sprayed over an external surface of the system that has potential leaks. The concentration of the gaseous tracer is then measured inside the system at a location downstream of the potential leak site. Any spike in the concentration of the gaseous tracer reading indicates the gaseous tracer was drawn into the system through one or more cracks. Likewise, a smoke bomb may be deployed, in which a user can visually observe smoke or colored gas discharged near an external facing surface of the system to see if any of the smoke or colored gas is drawn into the system. Yet another method of identifying cracks is to examine coke cooked in the oven. Since a crack may reduce the operating temperature and/or create an uneven temperature across the coke oven, the coke may not be fully coked out and/or may be cooked unevenly. Moreover, some coke may stick to the floor of the coke oven when being pushed out at the end of the coking cycle. Yet another potential method of identifying cracks is to visually identify the cracks.

The method 1000 continues by applying a first substance (e.g., a high temperature ceramic substance) over at least the first region containing the one or more cracks (process step 1004). As discussed above with respect to FIGS. 3-9, the ceramic substance may take a variety of configurations and may comprise a variety of materials. By applying the first high temperature ceramic substance, an airflow through the one or more cracks is at least partially reduced. The method 1000 optionally continues by applying a rigidizer to the first high temperature ceramic substance (process step 1006) and/or applying a second substance over the first high temperature ceramic substance (process step 1008).

Figure 11:
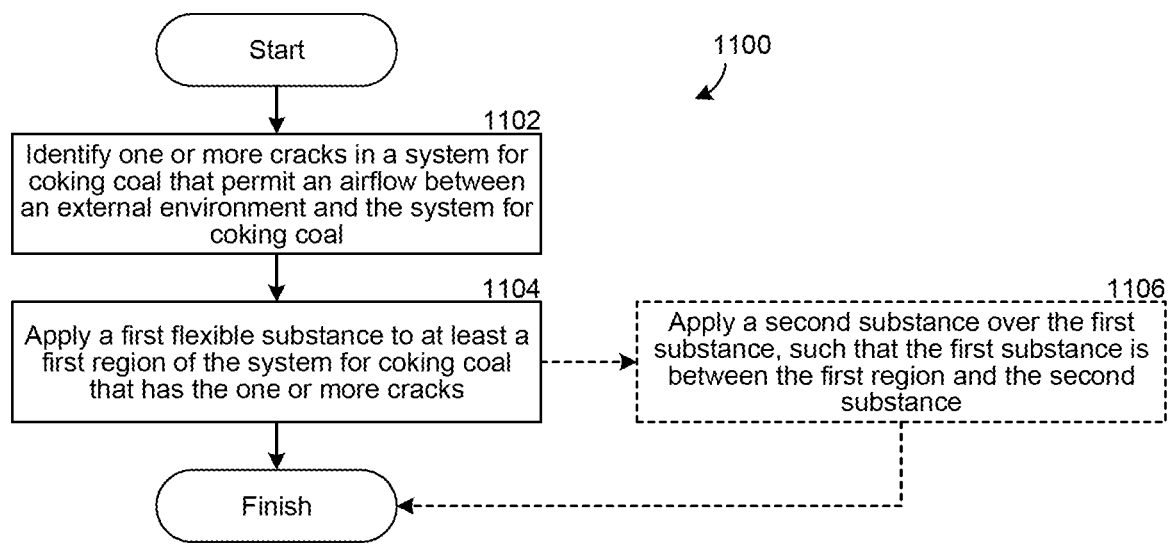
FIG. 11 is a flow diagram of a method of controlling uncontrolled air in a system for coking coal in accordance with select embodiments of the present technology.

FIG. 11 is a flow chart of a method 1100 for controlling uncontrolled air in a system for coking coal. The method 1100 includes identifying one or more cracks in the system for coking coal, wherein the one or more cracks permit an airflow between an external environment and the system for coking coal (process step 1102). Any of the techniques for identifying cracks described above with respect to FIG. 10, and any other techniques suitable for detecting cracks in coking systems, may be utilized. The method 1100 continues by applying a first substance to at least a first region of the system for coking coal that has the one or more cracks (process step 1104). The first substance may be flexible, and may be any substance identified above with respect to FIGS. 3-9. For example, the first substance may be a high temperature ceramic paper, a high temperature ceramic blanket, a high temperature ceramic spray, a flowable ceramic, a flowable polymer, a high temperature polymer, a silica material, a dust configured to coagulate, a vapor configured to coagulate, or insulated furnace brick. The first substance may also be a layered material comprising at least two layers, wherein each layer comprises a high temperature ceramic paper, a high temperature ceramic blanket, a high temperature ceramic spray, a flowable ceramic, a flowable polymer, a high temperature polymer, a silica material, a dust, a vapor, insulated furnace brick, a flexible coating, a fibrous material, a hard coating, a sealant, or any other suitable substance, and/or combinations thereof. The method 1100 optionally continues by applying a second substance over the first substance such that the first substance is between the first region and the second substance, thereby further reducing an airflow through the one or more cracks (process step 1106).

Figure 12:
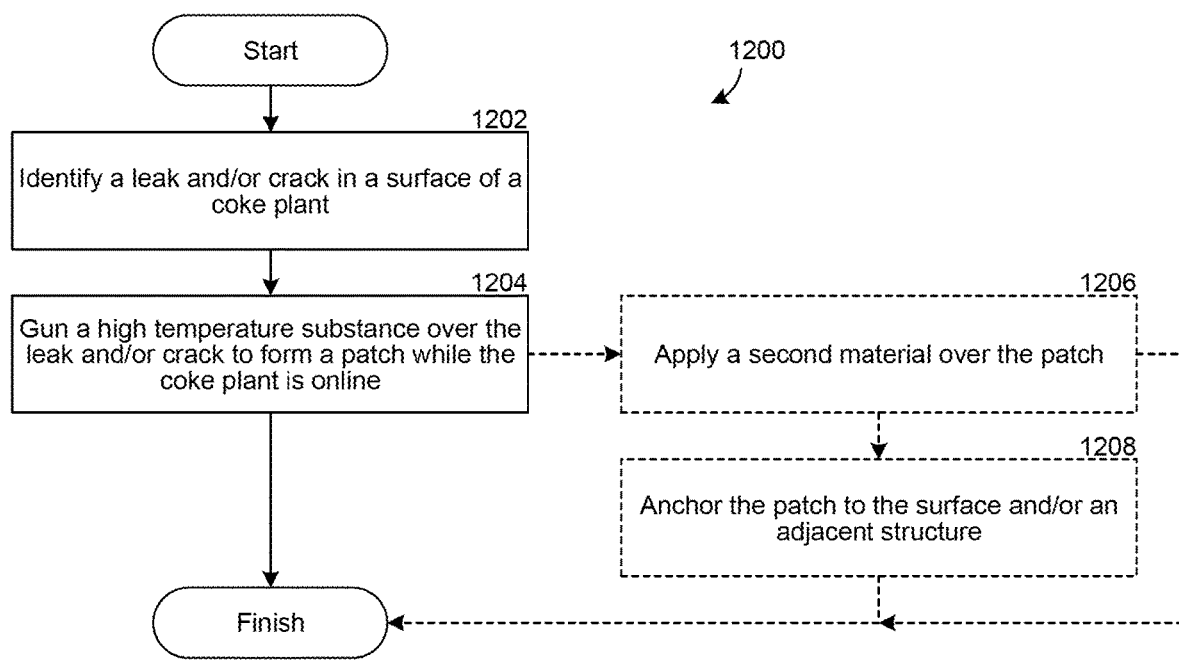
FIG. 12 is a flow diagram of a method of patching a leak in a coke plant in accordance with select embodiments of the present technology.

FIG. 12 is a flowchart of a method 1200 for repairing a surface of a coke plant that has one or more leaks. The method 1200 begins by identifying a surface of a coke plant that is leaking (process step 1202). In some embodiments, the surface may be a surface that at least partially defines a chamber (e.g., a sole flue, an oven, a tunnel, etc.). Any of the techniques for identifying cracks described above with respect to FIG. 10, and any other techniques suitable for detecting cracks in coking systems, may be utilized. The method 1200 continues by gunning a high temperature substance over the leaking surface while the coke plant remains in operation (i.e. without taking the coke plant offline) (process step 1204). Accordingly, the high temperature substance may be applied to the surface when the ambient temperature surrounding the surface (e.g., the temperature within the chamber) is 100 degrees Celsius or higher, 500 degrees Celsius or higher, 1,000 degrees Celsius or higher, and/or 1,500 degrees Celsius or higher. As described in detail above, the substance can form a patch that at least partially seals or otherwise reduces airflow through the leak. Optionally, a second substance can be applied to the first substance, such as a rigidizer, a sealant, etc. (process step 1206). The second substance may affect one or more properties of the patch, such as making it less permeable. The patch can optionally be anchored to the surface and/or one or more structures (e.g., walls) adjacent to the surface (process step 1208).

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the art will recognize. In some cases, well-known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein.

Throughout this disclosure, the singular terms "a,", "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of items in the list. Additionally, the term "comprising" is used throughout to mean including at least the recited feature(s) such that any greater number of the same feature and/or additional types of other features are not precluded. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A method of repairing a leak in a coke oven of a coke plant, the coke oven comprising a floor, opposing doors, opposing sidewalls, and a chamber defined by the floor, the opposing doors, and the opposing sidewalls, the method comprising:

applying a high temperature-resistant substance over at least a portion of a surface of the floor that includes the leak, wherein the high temperature-resistant substance— at least partially forms a patch that reduces the flow of gases through the leak, is a blanket or paper comprising a perimeter that, when applied over the surface, is peripheral to the leak and the high temperature-resistant substance is applied to the surface while the coke plant is operating.

2. The method of claim 1 wherein the surface at least partially defines a chamber, and wherein the high temperature-resistant substance is applied while a temperature within the chamber is at or above 100 degrees Celsius.

3. The method of claim 1 wherein the surface at least partially defines a chamber, and wherein the high temperature-resistant substance is applied while a temperature within the chamber is at or above 1200 degrees Celsius.

4. The method of claim 1 wherein the patch is at least partially flexible.

5. The method of claim 1, wherein the high-temperature-resistant substance is a second substance, the method further comprising, before applying the second high-temperature-resistant substance, applying a first high-temperature-resistant substance to the leak that is different than the second high-temperature resistant substance.

6. The method of claim 5 wherein applying the first high temperature-resistant substance comprises gunning the first high temperature-resistant substance onto the portion of the surface.

7. The method of claim 1, wherein the high-temperature resistant substance, when applied over the surface of the floor, forms an outermost portion of the floor.

8. A method of repairing a surface of a coke oven configured to operate under a negative pressure and having and oven floor, an oven chamber and a sole flue, the method comprising:

identifying a portion of a surface of the oven floor having one or more cracks, wherein the one or more cracks create an uncontrolled airflow into the coke oven from the sole flue; and applying a high temperature-resistant substance over at least the portion of the surface of the oven floor having the one or more cracks, wherein the high temperature-resistant substance comprises a blanket or paper having a perimeter that, when applied over the surface, is peripheral to the one or more cracks, wherein applying the high temperature-resistant substance at least partially reduces the airflow through the one or more cracks.

9. The method of claim 8 wherein the high temperature-resistant substance, when applied over the surface of the oven floor, forms an outermost portion of the floor and configured to contact gas flowing through the coke oven.

10. The method of claim 8 wherein the high temperature-resistant substance is a second high temperature-resistant substance, the method further comprising applying a first high temperature-resistant substance that comprises a spray or flowable material over the one or more cracks, wherein applying the second high temperature-resistant substance comprises applying the second high-temperature-resistant substance over the first high temperature-resistant substance.

11. The method of claim 8 wherein the one or more cracks are identified by (i) observing that the coke oven does not operate at a generally normal temperature, (ii) observing a reduced level of control over the amount of air entering the coke oven, (iii) visually identifying the one or more cracks, (iv) using a gaseous tracer leak detector test, (v) using a smoke bomb test, and/or (vi) observing that the coke coked in the oven is not fully coked out.

12. The method of claim 8 wherein applying the high temperature-resistant substance comprises applying the high temperature-resistant substance without taking the coke oven offline.

13. The method of claim 8, wherein the applied high-temperature resistant substance is a flexible material.

14. A method of controlling uncontrolled air in a system for coking coal, the method comprising:

identifying one or more cracks in an oven floor of the system for coking coal, wherein the one or more cracks permit an airflow between an external environment and a structure within the system for coking coal; and applying a first substance to at least a first region of the oven floor having the one or more cracks, wherein the first substance is at least partially flexible, and wherein the first substance comprises a blanket or paper having a perimeter that, when applied to the first region, is peripheral to the one or more cracks;

wherein applying the first substance to the oven floor at least partially reduces the airflow through the one or more cracks.

15. The method of claim 14 wherein applying the first substance reduces a pressure differential through the one or more cracks.

16. The method of claim 14 wherein the first substance is a high temperature-resistant ceramic paper a high temperature-resistant ceramic blanket, or insulated furnace brick.

17. The method of claim 14 wherein the first substance is a layered material comprising at least two layers, wherein each layer comprises a high temperature-resistant ceramic paper or a high temperature-resistant ceramic blanket.

18. The method of claim 14, wherein the first substance, after being applied to the first region, is a flexible material.

* * * * *

UNITED STATES PATENT AND TRADEMARK OFFICE
CERTIFICATE OF CORRECTION

| | |
|---|---|
| PATENT NO. | : 11,365,355 B2 |
| APPLICATION NO. | : 16/729036 |
| DATED | : June 21, 2022 |
| INVENTOR(S) | : John Francis Quanci et al. |

It is certified that error appears in the above-identified patent and that said Letters Patent is hereby corrected as shown below:

In the Drawings

In Sheet 10 of 15, Fig. 8B, Reference Numeral 824, Line 1, delete "824" and insert --820-- therefor.

In the Specification

In Column 9, Line 64, delete "526" and insert --524-- therefor.

In Column 9, Line 66, delete "526" and insert --524-- therefor.

In Column 11, Line 20, delete "724" and insert --722-- therefor.

In Column 11, Line 22, delete "722 722." and insert --722.-- therefor.

In the Claims

In Column 17, Line 32, delete "and" and insert --an-- therefor.

Signed and Sealed this
Thirtieth Day of August, 2022

Katherine Kelly Vidal
*Director of the United States Patent and Trademark Office*